United States Patent
Ibaraki et al.

(10) Patent No.: US 10,782,550 B2
(45) Date of Patent: Sep. 22, 2020

(54) LIQUID CRYSTAL DISPLAY DEVICE

(71) Applicant: Panasonic Liquid Crystal Display Co., Ltd., Hyogo (JP)

(72) Inventors: Hiroshi Ibaraki, Hyogo (JP); Tomohiro Murakoso, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/438,441

(22) Filed: Jun. 11, 2019

(65) Prior Publication Data

US 2019/0293992 A1 Sep. 26, 2019

Related U.S. Application Data

(63) Continuation of application No. 15/992,191, filed on May 30, 2018, which is a continuation of application No. 15/009,839, filed on Jan. 29, 2016, now Pat. No. 10,042,198.

(51) Int. Cl.
  *G02F 1/1335* (2006.01)
  *G02F 1/1362* (2006.01)
  *G02F 1/1333* (2006.01)
  *G02F 1/1345* (2006.01)

(52) U.S. Cl.
  CPC .. *G02F 1/133512* (2013.01); *G02F 1/136204* (2013.01); *G02F 1/136286* (2013.01); *G02F 1/13454* (2013.01); *G02F 2001/133388* (2013.01); *G02F 2202/22* (2013.01)

(58) Field of Classification Search
  CPC ......... G02F 1/133512; G02F 1/136204; G02F 1/13454; G02F 1/136286; G02F 2202/22; G02F 2001/133388; G02F 1/1339
  USPC ...................................................... 349/110
  See application file for complete search history.

(56) References Cited

U.S. PATENT DOCUMENTS

| | | | |
|---|---|---|---|
| 7,746,428 B2 * | 6/2010 | Kobayashi | G02F 1/1339 349/110 |
| 2006/0056267 A1 * | 3/2006 | Kim | G09G 3/3677 365/230.06 |

* cited by examiner

*Primary Examiner* — Nathanael R Briggs
*Assistant Examiner* — William D Peterson
(74) *Attorney, Agent, or Firm* — HEA Law PLLC

(57) ABSTRACT

In a liquid crystal display device, a display panel includes a display region in which an image is to foe displayed, and a non-display region formed into a frame shape surrounding the display region. The non-display region includes a first region in which the gate driver is arranged, and a second region in which the source driver is arranged. The non-display region has a non-light transmitting layer formed therein, which is configured to restrict transmission of light. The non-light transmitting layer has a first slit formed therein, which extends through the first region and the second region and passes through the non-light transmitting layer.

14 Claims, 15 Drawing Sheets

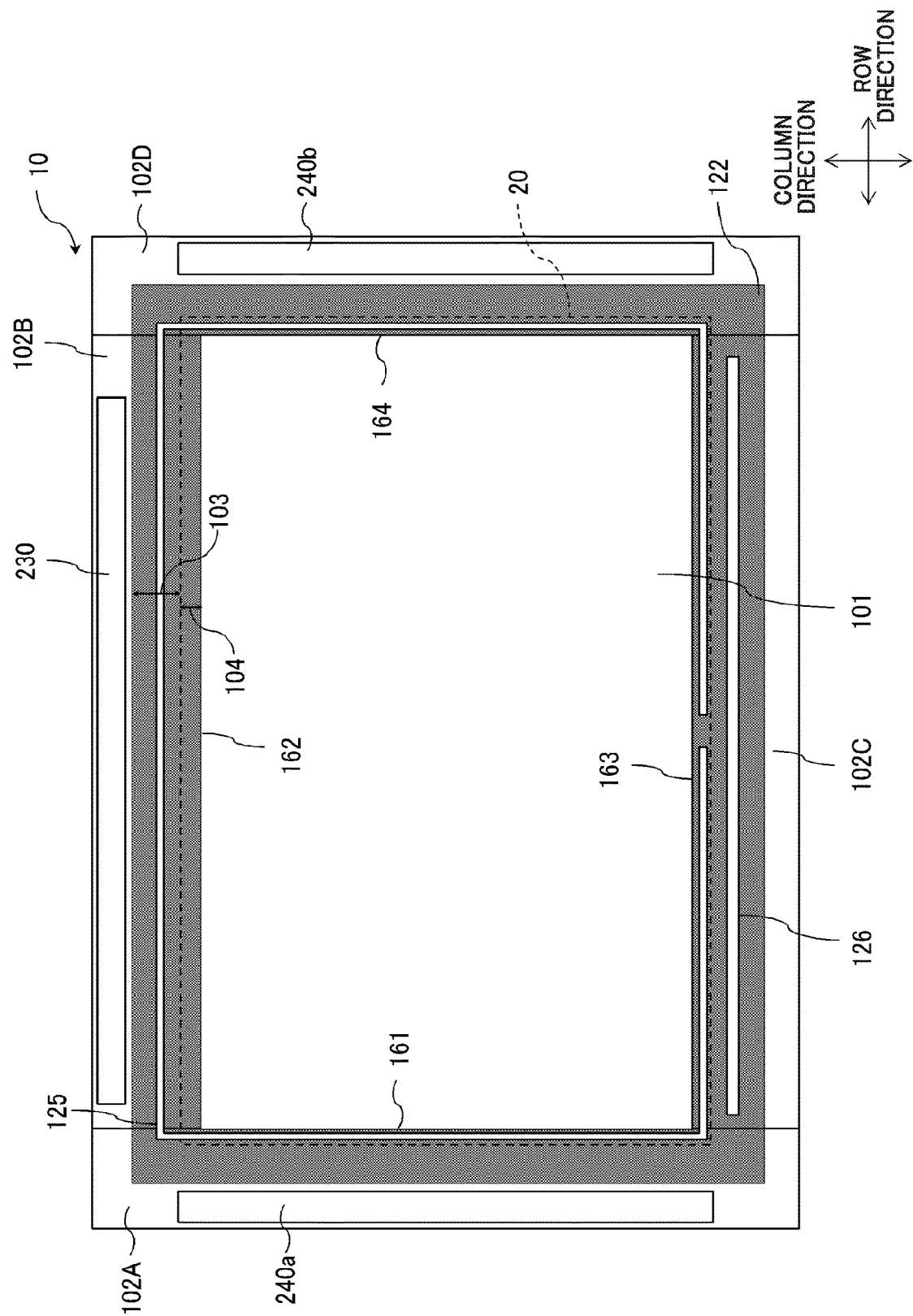

LIQUID CRYSTAL DISPLAY DEVICE

CROSS REFERENCE TO RELATED APPLICATIONS

This application claims priority to and is a continuation of U.S. application Ser. No. 15/992,191 filed on May 30, 2018 which is claiming benefit of U.S. application Ser. No. 15/009,839 filed on Jan. 29, 2016. The contents of each of the above documents are incorporated herein by reference in their entirety.

BACKGROUND OF THE INVENTION

1. Field of the Invention

The present application relates to a liquid crystal display device.

2. Description of the Related Art

In Japanese Patent Application Laid-open No. 2009-48178, there is disclosed a liquid crystal display device in which a black matrix (non-light transmitting layer) configured to block light is formed in a non-display region surrounding a display region. It is known that electric charges are generated in the non-display region due to wiring coupling of a gate line. When an electric field formed between the electric charges and a pixel electrode is applied to a liquid crystal layer, the molecule alignment in the liquid crystal layer may be changed to cause unintended color display (color change).

SUMMARY OF THE INVENTION

Along with reduction in size and increase in density of the liquid crystal display device, the number of wirings arranged in the non-display region is increased. Therefore, it is desired to more effectively suppress the influence an a display image due to the electric charges generated by the wiring coupling.

The present application has been made in view of the above-mentioned problem, and has an object to provide a liquid crystal display device capable of reducing the influence on the display image due to the electric charges generated by the wiring coupling.

In order to solve the above-mentioned problem, according to one embodiment of the present application, there is provided a liquid crystal display device, including: a display panel including a plurality of gate lines extending in a row direction, and a plurality of data lines extending in a column direction; a gate driver configured to supply a gate signal to the plurality of gate lines; and a source driver configured to supply a source signal to the plurality of source lines, the display panel including a display region in which an image is to be displayed, and a non-display region formed into a frame shape surrounding the display region, the non-display region including a first region in which the gate driver is arranged, and a second region in which the source driver is arranged, the non-display region having a non-light transmitting layer formed therein, which is configured to restrict transmission of light, the non-light transmitting layer having a first slit formed therein, which extends through the first region and the second region and passes through the non-light transmitting layer.

In the liquid crystal display device according to the one embodiment of the present application, the non-display region may further include a third region opposed to the second region across the display region, and the first slit may further extend through the first region and the third region.

In the liquid crystal display device according to the one embodiment of the present application, the non-display region may further include a fourth region opposed to the first region across the display region, and the first slit may further extend through the second region and the fourth region and through the third region and the fourth region.

In the liquid crystal display device according to the one embodiment of the present application, the non-light transmitting layer may further have a second slit formed therein, which is different from the first slit, and a part of the second slit may be formed along the first slit and between the first slit and the display region.

In the liquid crystal display device according to the one embodiment of the present application, when the non-display region is viewed from the display region, the second slit may be formed so as to cover an end portion of the first slit.

In the liquid crystal display device according to the one embodiment of the present application, at least one of the first region or the second region may include a region in which the first slit and the second slit extend in parallel with each other, and a region in which only the first slit extends.

The liquid crystal display device according to the one embodiment of the present application may further include an upper frame arranged on a front surface side of the display panel. In the liquid crystal display device according to the one embodiment of the present application, the non-light transmitting layer may include an overlapping region overlapping with the upper frame in plan view, and a non-overlapping region free from overlapping with the upper frame in plan view, and the first slit formed in the overlapping region may have a width larger than a width of the first slit formed in the non-overlapping region.

According to one embodiment of the present application, there is provided a liquid crystal display device, including a display panel including a plurality of gate lines extending in a row direction, and a plurality of data lines extending in a column direction, the display panel including a display region in which an image is to be displayed, and a non-display region formed into a frame shape surrounding the display region, the non-display region having a non-light transmitting layer formed therein, which is configured to restrict transmission of light, the non-light transmitting layer having, at least on one side of the non-display region, a first slit and a second slit formed therein, which pass through the non-light transmitting layer, the non-display region including a region in which the first slit and the second slit extend in parallel with each other, and a region in which only the first slit extends.

According to one embodiment of the present application, there is provided a liquid crystal display device, including: a display panel including a plurality of gate lines extending in a row direction, and a plurality of data lines extending in a column direction; and an upper frame arranged on a front surface side of the display panel, the display panel including a display region in which an image is to be displayed, and a non-display region formed into a frame shape surrounding the display region, the non-display region having a non-light transmitting layer formed therein, which is configured to restrict transmission of light, the non-display region including an overlapping region overlapping with the upper frame in plan view, and a non-overlapping region free from overlapping with the upper frame in plan view, the non-light transmitting layer having a first slit formed therein, which passes through the non-light transmitting layer, the first slit formed in the overlapping region having a width larger than a width of the first slit formed in the non-overlapping region.

BRIEF DESCRIPTION OF THE DRAWINGS

FIG. 15 is a view for illustrating an example of the second slit formed on the outer side with respect to the first slit.

DETAILED DESCRIPTION OF THE INVENTION

Figure 1:
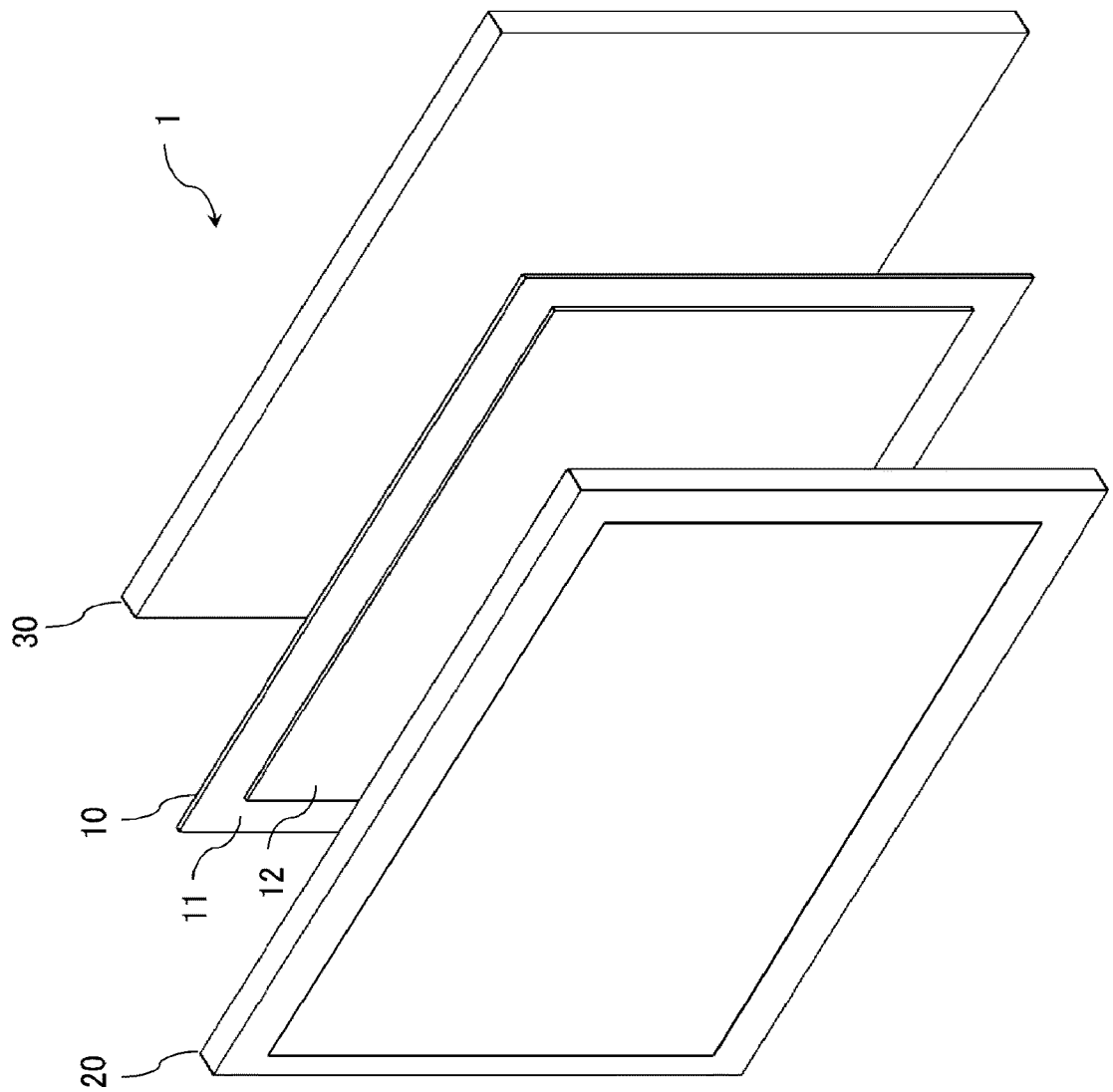
FIG. 1 is a perspective view for illustrating an entire configuration of a liquid crystal display device according to an embodiment of the present application.

Referring to the accompanying drawings, embodiments of the present invention are described below, in the drawings, the same or similar components are denoted by the same reference symbols, and redundant description thereof is omitted herein.

First Embodiment

FIG. 1 is a perspective view for illustrating an entire configuration of a liquid crystal display device 1 according to this embodiment. As illustrated in FIG. 1, the liquid crystal display device 1 according to this embodiment includes a display panel 10, an upper frame 20, and a lower frame 30. The display panel 10 includes a TFT substrate 11, a CF substrate 12, a liquid crystal layer (not shown) sand- wiched between both the substrates, and a backlight unit (not shown) configured to radiate light from the back surface side. Further, the display panel 10 as supported between the upper frame 20 arranged on the front surface side of the display panel 10 (front surface side of the CF substrate 12) and the lower frame 30 arranged on the back surface side of the display panel 10 (back surface side of the TFT substrate 11).

Figure 2:
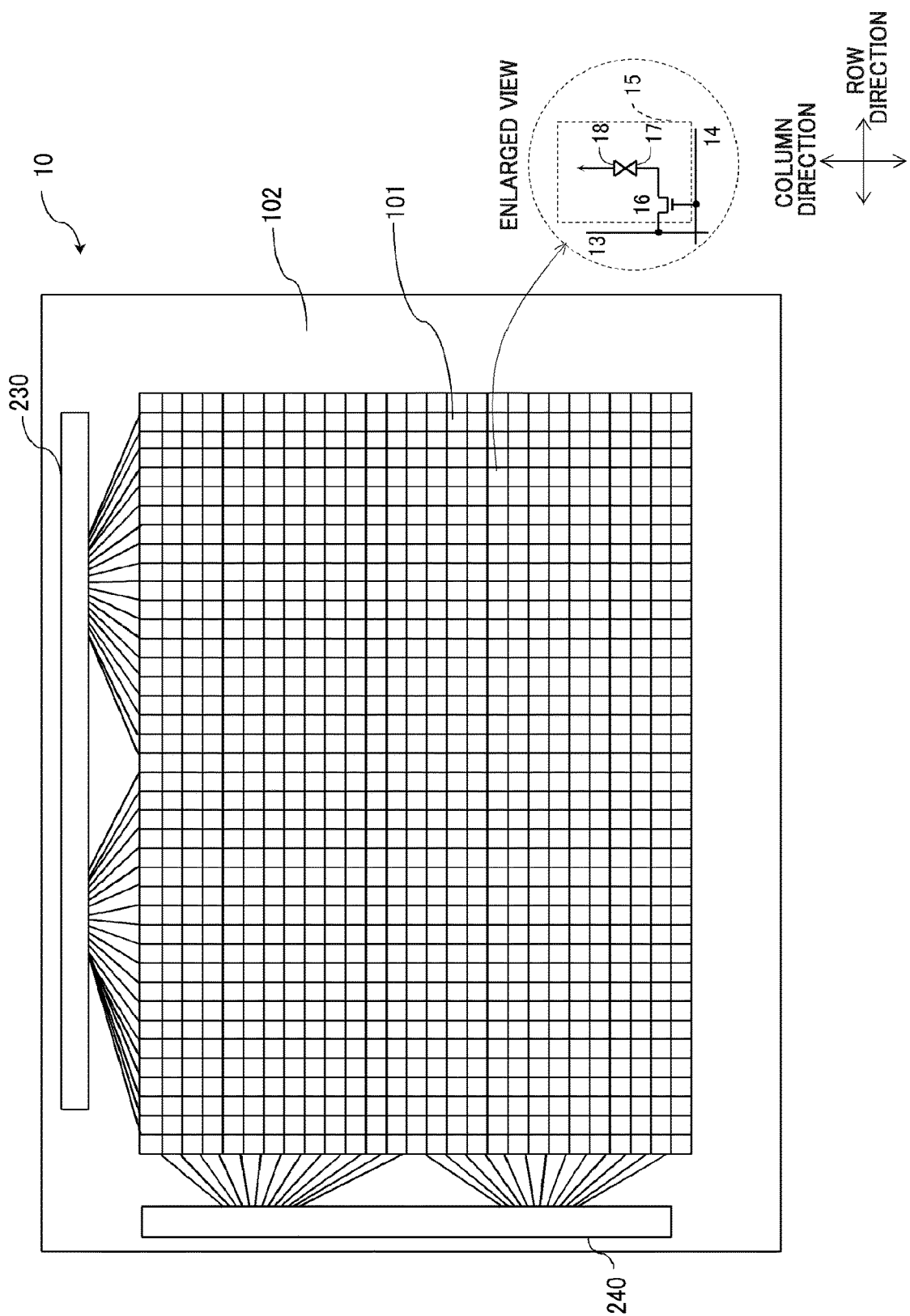
FIG. 2 is a plan view for illustrating a schematic structure of a display panel according to the embodiment.

FIG. 2 is a plan view for illustrating a schematic configuration of the display panel 10 according to this embodiment. The display panel 10 includes a display region 101 in which an image is to be displayed, and a non-display region 102 formed into a frame shape surrounding the display region 101.

The display region 101 includes a plurality of data lines 13 extending in a column direction, and a plurality of gate lines 14 extending in a row direction. The respective data lines 13 are electrically connected to a source driver 230. The respective gate lines 14 are electrically connected to a gate driver 240. A plurality of pixels 15 are arranged in matrix (row direction and column direction) so as to correspond to respective intersecting portions of the respective data lines 13 and the respective gate lines 14. For each pixel 15, a thin film transistor 16, a pixel electrode 17, and a common electrode 18 are formed. The thin film transistor 16 is formed at each intersecting portion between each data line 13 and each gate line 14. Note that, the direction in which the data line 13 extends is referred to as the column direction, and the direction in which the gate line 14 extends is referred to as the row direction.

The non-display region 102 includes a driving circuit (source driver 230 and gate driver 240) configured to cause image display in the display region 101. The driving circuit is arranged at a peripheral portion of the display region 101 in plan view. Specifically, in plan view, the gate driver 240 is arranged on the left side of the display region 101, and the source driver 230 is arranged on the upper side of the display region 101. Note that, the arrangement of the driving circuit is not limited to the example illustrated in FIG. 2. For example, in plan view, the gate driver 240 may be arranged on each of the left side and the right side of the display region 101, or the gate driver 240 may be arranged on any one of the left side and the right side of the display region 101. Further, in plan view, the source driver 230 may be arranged on each of the upper side and the lower side of the display region 101, or the source driver 230 may be arranged on any one of the upper side and the lower side of the display region 101.

Figure 3:
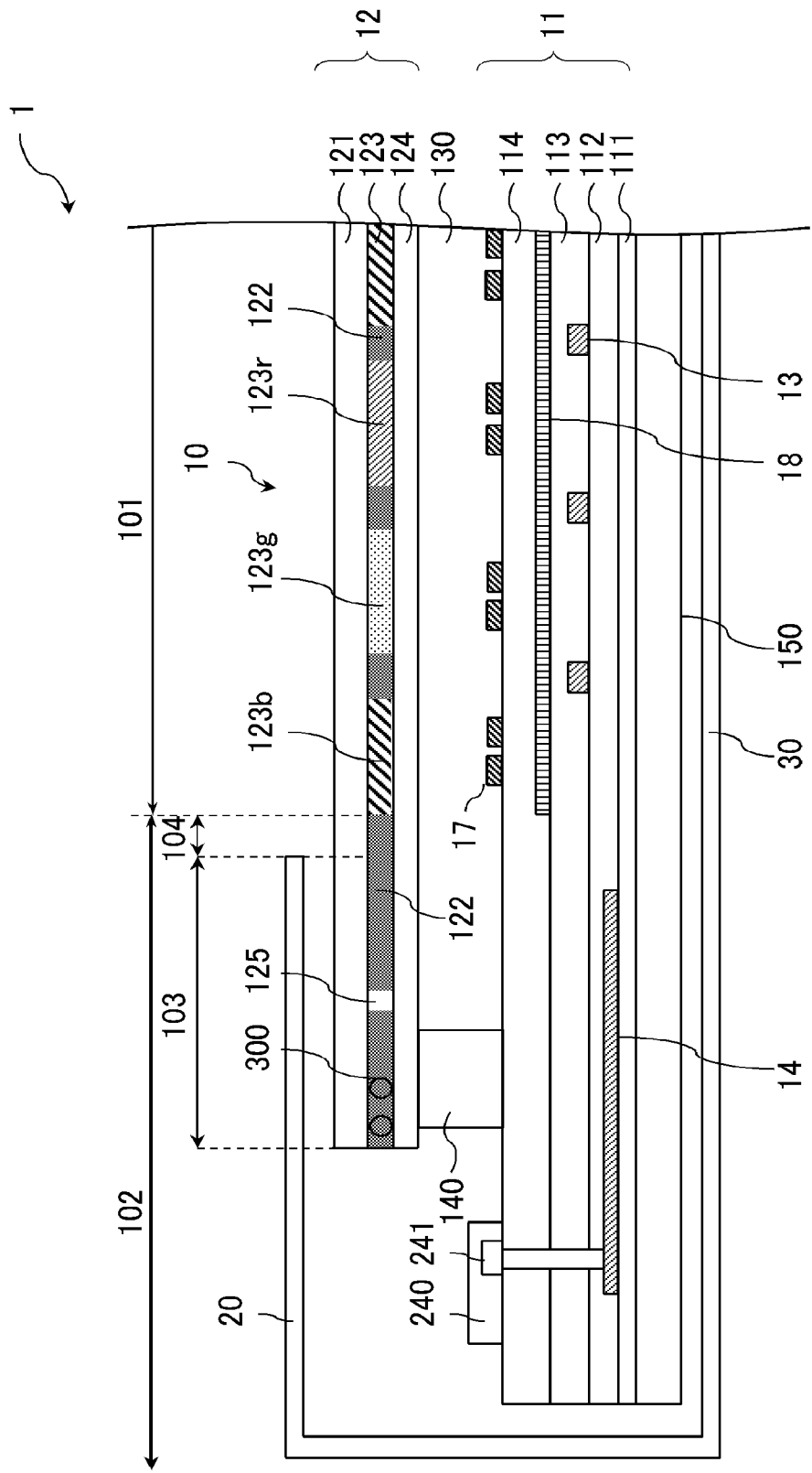
FIG. 3 is a sectional view for illustrating an example of a configuration of a liquid crystal display device according to a first embodiment of the present invention.

FIG. 3 is a sectional view for illustrating an example of the configuration of the liquid crystal display device 1 according to a first embodiment of the present invention. The liquid crystal display device 1 includes the display panel 10, the upper frame 20, and the lower frame 30. The display panel 10 includes the TFT substrate 11 arranged on the back surface side, the CF substrate 12 arranged on the front surface side, a liquid crystal layer 130 sandwiched between the TFT substrate 11 and the CF substrate 12, a sealing member 140 surrounding the liquid crystal layer 130 and being sandwiched between the TFT substrate 11 and the CF substrate 12, and a backlight unit 150 configured to radiate light from the back surface side.

In the TFT substrate 11, the gate lines 14 are formed on a glass substrate 111, and an insulating film 112 is formed so as to cover the gate lines 14. Further, the data lines 13 are formed on the insulating film 112, and an insulating film 113 is formed so as to cover the data lines 13. Further, the common electrode 13 is formed on the insulating film 113, and an insulating film 114 is formed so as to cover the common electrode 18. Further, the pixel electrode 27 is formed on the insulating film 114, and an alignment film (not shown) is formed so as to cover the pixel electrode 17. Although not shown, a polarizing plate and the like are further formed in the TFT substrate 11.

In the CF substrate 12, a non-light transmitting layer 122 (black matrix) configured to restrict the transmission of light and a colored layer 123 (for example, a red color filter 123r, a green color filter 123g, and a blue color filter 123b) configured to transmit light are formed on a glass substrate 121, and an overcoat layer 124 is formed so as to cover those layers. Further, an alignment film (not shown) is formed on the overcoat layer 124. Although not shown, a polarizing plate and the like are further formed in the CF substrate 12. Further, in the CF substrate 12, the non-light transmitting layer 122 and the colored layer 123 are formed an a stripe pattern in the display region 101, and the non-light transmitting layer 122 is formed in the non-display region 102.

The TFT substrate 11 is formed into a rectangular shape that is larger than the CF substrate 12, and terminals to be electrically connected to various wirings such as the data lines 13 and the gate lines 14 are arranged at a peripheral, edge portion that does not overlap with the CF substrate 12. In FIG. 3, a gate terminal 241 electrically connected to the gate line 14 is arranged, and the gate driver 240 is mounted on the gate terminal 241. Note that, the gate terminal 241 may be electrically connected to a flexible printed board having the gate driver 240 mounted thereon.

A method of driving the liquid crystal display device 1 is simply described. A data signal (data voltage) is supplied to each of the data lines 13 from the source driver 230. A gate signal (gate voltage) is supplied to each of the gate lines 14 from the gate driver 240. A common voltage Vcom is supplied to the common electrode 18 via a common wiring (not shown). When an ON voltage of a gate signal (gate ON voltage) is supplied to a gate line 14, a thin film transistor 16 connected to the gate line 14 is turned on, and the data voltage is supplied to a pixel electrode 17 via a data line 13 connected to the thin film transistor 16. An electric field is generated due to a difference between the data voltage supplied to the pixel electrode 17 and the common voltage Vcom supplied to the common electrode 19. The electric field drives the liquid crystal to control transmittance of light emitted from the backlight unit 150, thereby displaying an image. Note that, when color display is performed, the display is realized by supplying a desired data voltage to each of the data lines 13 connected to pixel electrodes 17 of pixels 15 corresponding to a red color filter 123r, a green color filter 123g, and a blue color filter 123b formed with stripe-like color filters. Note that, the common electrode 18 may be formed on the TFT substrate 11, or may be formed on the CF substrate 12. The above-mentioned method of driving the liquid crystal, display device 1 is merely an example, and other known methods can also be employed.

In this case, when a pulsed gate signal is applied to the gate line 14 from the gate driver 240 to display an image on the liquid crystal display device 1, electric charges 300 generated by wiring coupling in the gate line 14 propagate to the display region 101 through the non-light transmitting layer 122, and an electric field is generated between the electric charges 300 and the pixel electrode 17. As described above, in the liquid crystal display device 1, an image is displayed by controlling the transmittance of light passing through the liquid crystal layer 130 based on the electric field formed between the pixel electrode 17 and the common electrode 18. When the electric field formed between the electric charges 300 and the pixel electrode 17 is applied to the liquid crystal layer 130, the molecule alignment of the liquid crystal is changed, with the result that an unintended color display (color change) may occur in the display image.

In the first embodiment, a first slit 125 is formed in the non-light transmitting layer 122 formed in the non-display region 102 of the CF substrate 12. Thus, the influence on a display image due to propagation to the display region 101 of the electric charges 300 generated by wiring coupling of the gate line 14 is reduced.

Now, the configuration of the first slit 125 formed in the non-light transmitting layer 122 according to the first embodiment is specifically described.

Figure 4:
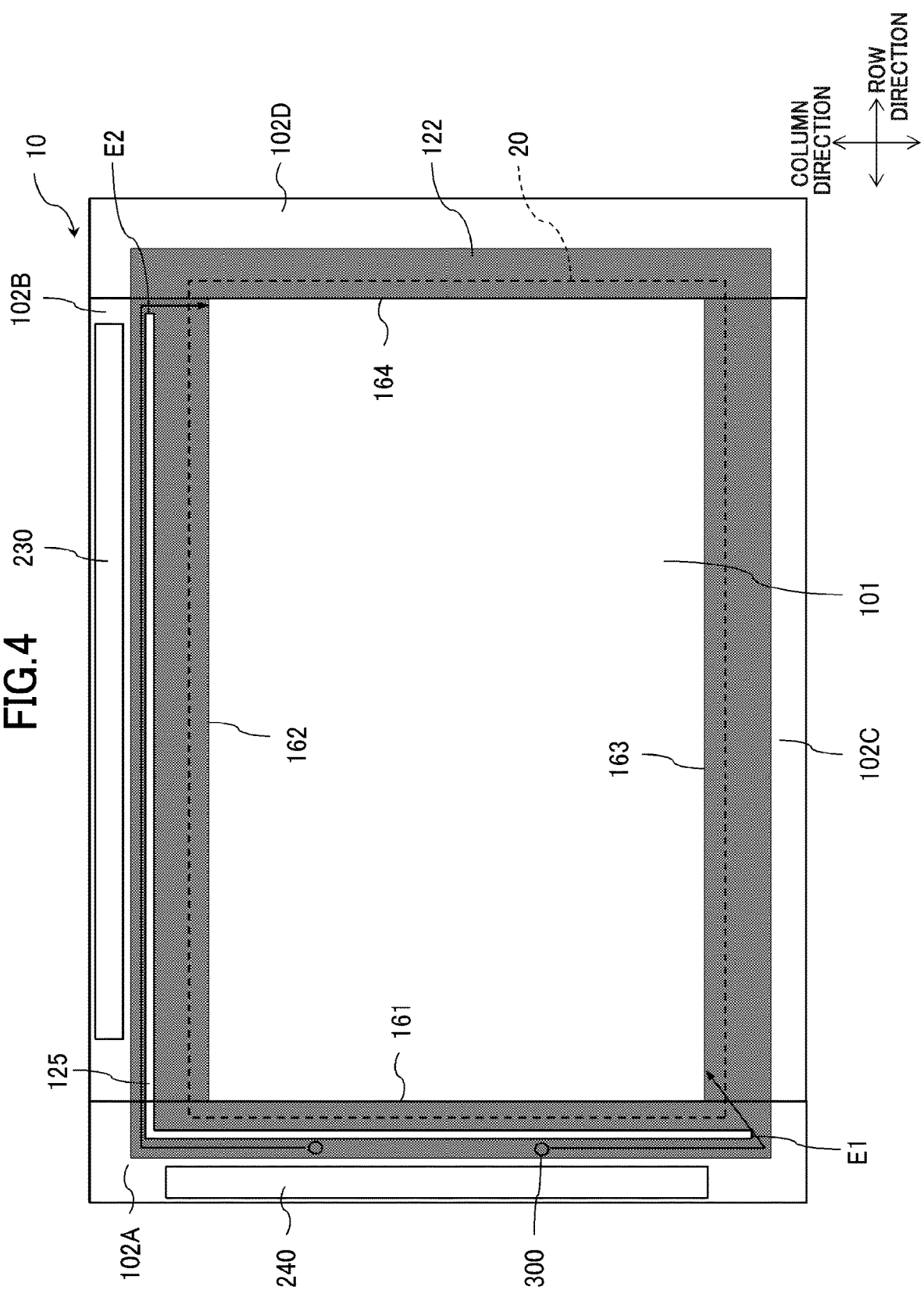
FIG. 4 is a view for illustrating a first example of a first slit formed in a non-light transmitting layer according to the first embodiment.

FIG. 4 is a view for illustrating a first example of the first slit 125 formed in the non-light transmitting layer 122 according to the first embodiment. FIG. 4 is a plan view of the display panel 10 as viewed from the CF substrate 12 side. As illustrated in FIG. 4, in the non-display region 102 formed into a frame shape surrounding the display region 101, the source driver 230, the gate driver 240, the non-light transmitting layer 122, and the first slit 125 are formed. In FIG. 4, the illustration of the inside of the display region 101 and the illustration of various wirings such as the data lines 13 and the gate lines 14 are emitted.

The display region 101 is a substantially rectangular region having four sides, specifically, a first side 161 to a fourth side 164. The display region 101 includes two sides (first side 161 and fourth side 164) extending in the column direction, and two aides (second side 162 and third side 163) connecting together the first side 161 and the fourth side 164 and extending in the row direction. Further, the gate driver 240 is arranged on one or both of the first side 165 side and the fourth side 164 side. Further, the source driver 230 is arranged on one or both of the second side 162 side and the third side 163 side.

The non-display region 102 is a frame-shaped region having four regions, specifically, a first region 102A to a fourth region 102D. In the non-display region 102, the first region 102A refers to a region in which the gate driver 240 is arranged, and the second region 102B refers to a region in which the source driver 230 is arranged. The second region 102B refers to one of two regions in contact with the first region 102A, and the third region 102C refers to the other of the two regions in contact with the first region 102A (region opposed to the second region across the display region). The fourth region 102D refers to a region in contact with the second region 102B and the third region 102C and opposed to the first region 102A (region opposed to the first region across the display region). Note that, in FIG. 4, there is illustrated an example in which the gate driver 240 is arranged on the first side 161 side of the display region 101, but the gate driver 240 may be arranged on the fourth side 164 side of the display region 101. In this case, the first region 102A corresponds to the region on the fourth side 164 side, in which the gate driver 240 is arranged. Note that, the gate driver 240 may be arranged in both of the first region 101A and the fourth region 104D. Further, in FIG. 4, there is illustrated an example in which the source driver 230 is arranged on the second side 162 side of the display region 101, but the source driver 230 may foe arranged on the third side 163 side or the display region 101. In this case, the second region 102B corresponds to the region on the third side 163 side, in which the source driver 230 is arranged. Note that, the source driver 230 may be arranged in both of the second region 102B and the third region 102C.

In the non-light transmitting layer 122 formed in the non-display region 102 illustrated in FIG. 4, the first slit 125 is formed, which extends through the first region 102A in which the gate driver 210 is arranged and the second region 102B. The first slit 125 is formed so as to pass through the non-light transmitting layer 122. The first slit 125 illustrated in FIG. 4 is a single continuous slit, which seamlessly extends through the first region 102A and the second region 102B. In other words, one of the two end portions (first end portion E1) of the first slit 125 is included in the first region 102A, and the other thereof (second end portion E2) is included in the second region 102B. Further, the first slit 125 illustrated in FIG. 4 extends linearly along the first side 161 of the display region 101 in the first region 102A, and extends linearly along the second side 162 of the display region 101 in the second region 102B. Therefore, the first slit 125 is formed so as to be bent substantially at a right angle at a corner portion of the non-display region 102 (corner portion at which the first region 102A and the second region 102B are in contact). Note that, the first slit 125 is not limited to an example of being formed so as to be bent substantially at a right angle at the corner portion of the non-display region 102. For example, the first slit 125 may be formed so as to be curved into an arc shape at the corner portion of the non-display region 102. Further, the first slit 125 may be formed into a shape extending along the outer shape of the display region 301.

Note that, in FIG. 4, the first slit 125 extends through two regions, specifically, the first region 102A and the second region 102B, but the first slit 125 is not limited to this example. For example, the first slit 125 may extend through the first region 102A and the third region 102C.

The first slit 325 is formed so as to extend through the first region 102A in which the gate driver 240 is arranged and through the second region 102B formed in contact with the first region 102A. Thus, the electric charges 300 generated by the wiring coupling of the gate line 14 in the first, region 102A move on the outer side of the first slit 125 to reach the first end portion E1 included in the first region 102A or the second end portion E2 included in the second region 102B, to thereby propagate to the display region 101. As described above, with this configuration, as compared to the case where the slit is formed only in the region in which the gate driver 240 is arranged, a path for the electric charges 300 generated by the wiring coupling of the gate line 14 to propagate to the display region 101 can be taken longer. With this, the influence on the display image due to the electric charges generated by the wiring coupling of the gate line 14 is reduced.

Figure 5:
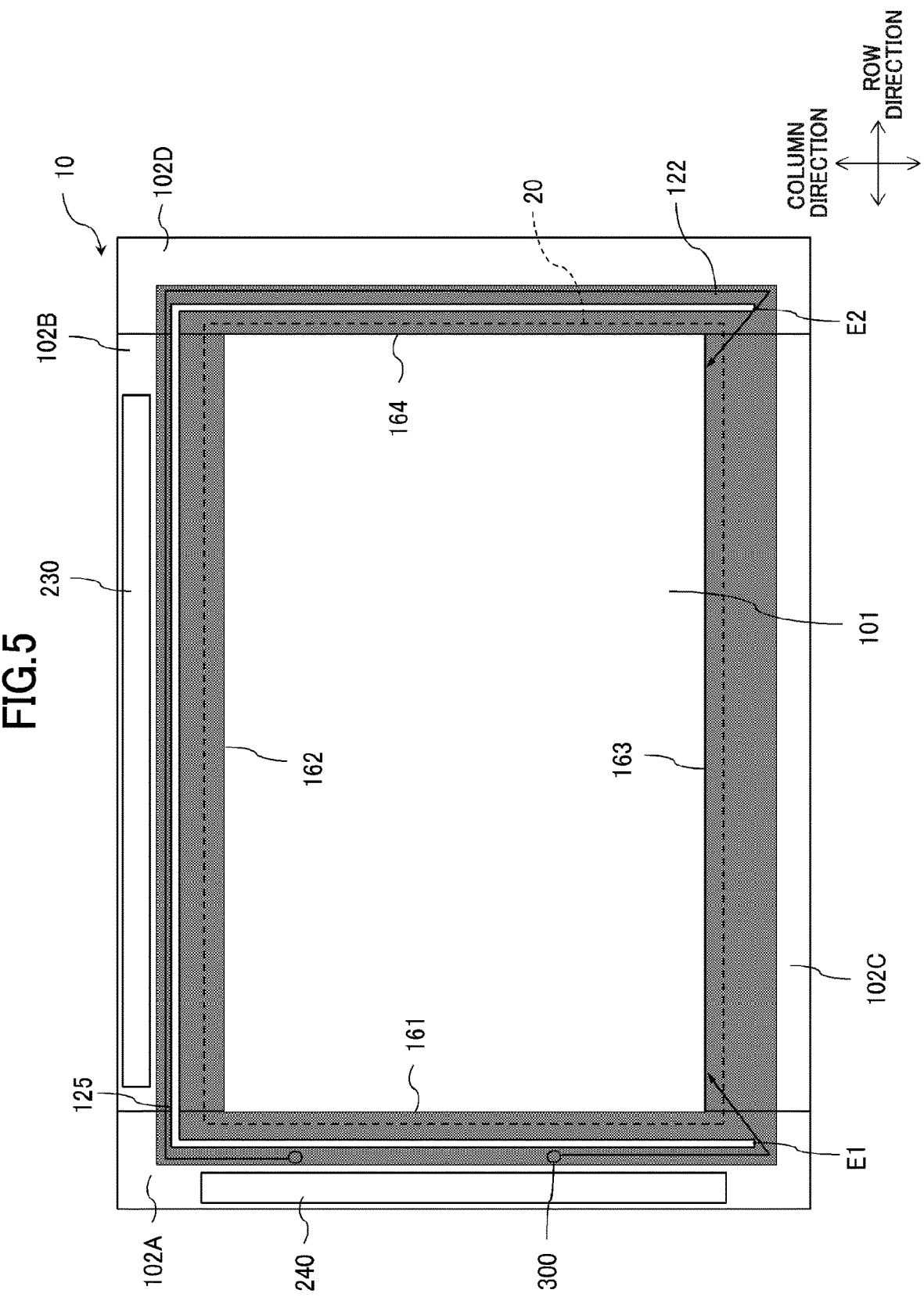
FIG. 5 is a view for illustrating a second example of the first slit formed in the non-light transmitting layer according to the first embodiment.

FIG. 5 is a view for illustrating a second example of the first slit 125 formed in the non-light transmitting layer 122 according to the first embodiment. FIG. 5 is a plan view of the display panel 10 as viewed from the CF substrate 12 side. The second example of the first slit 125 illustrated in FIG. 6 differs from the first example of the first slit 125 illustrated in FIG. 4 in the shape of the first slit 125, but other points are the same. Therefore, configurations similar to those in the first example of the first slit 125 illustrated in FIG. 4 are denoted by the same reference symbols, and redundant description thereof is omitted herein.

In the non-light transmitting layer 122 formed in the non-display region 102 illustrated in FIG. 5, the first slit 125 is formed, which extends through the first region 102A in which the gate driver 240 is arranged, the second region 102B, and the fourth region 102D. The first slit 125 is formed so as to pass through the non-light transmitting layer 122. The first slit 125 illustrated in FIG. 5 is a single continuous slit, which seamlessly extends through the first region 102A, the second region 102B, and the fourth region 102D. In other words, one of the two end portions (first end portion E1) of the first slit 12b is included in the first region 102A, and the other thereof (second end portion E2) is included in the fourth region 102D. The first slit 125 illustrated in FIG. 5 extends linearly along the first side 161 of the display region 101 in the first region 102A, extends linearly along the second side 162 of the display region 101 in the second region 102B, and extends linearly along the fourth side 164 of the display region 101 in the fourth region 102D. Therefore, the first slit 125 is formed so as to be bent substantially at a right angle at a corner portion of the non-display region 102 (corner portion at which the first region 102A and the second region 102B are in contact and corner portion at which the second region 102B and the fourth region 102D are in contact). Note that, the first slit 125 is not limited to an example of being formed so as to be bent substantially at a right angle at each corner portion. For example, the first slit 125 may be formed so as to be curved into an arc shape at each corner portion. Further, the first slit 125 may be formed into a shape extending along the outer shape of the display region 101.

The first slit 126 is formed so as to extend through the first region 102A in which the gate driver 240 is arranged, the second region 102B, and the fourth region 102D. Thus, the electric charges 300 generated by the wiring coupling of the gate line 14 move on the outer side of the first slit 125 to reach the first end portion E1 included in the first region 102A or the second end portion E2 included in the fourth region 102D, to thereby propagate to the display region 301. With this configuration, as compared to the case where the slit is formed only in the region in which the gate driver 240 is arranged, a path for the electric charges 300 generated by the wiring coupling of the gate line 14 to propagate to the display region 101 can be taken longer. With this, the influence on the display image due to the electric charges generated by the wiring coupling of the gate line 14 is reduced.

Note that, in FIG. 5, the first slit 125 extends through three regions, specifically, the first region 102A, the second region 102B, and the fourth region 102D, but the first slit 125 is not limited to this example. For example, the first slit 125 may extend through the first region 102A, the third region 102C, and the fourth region 102D.

Figure 6:
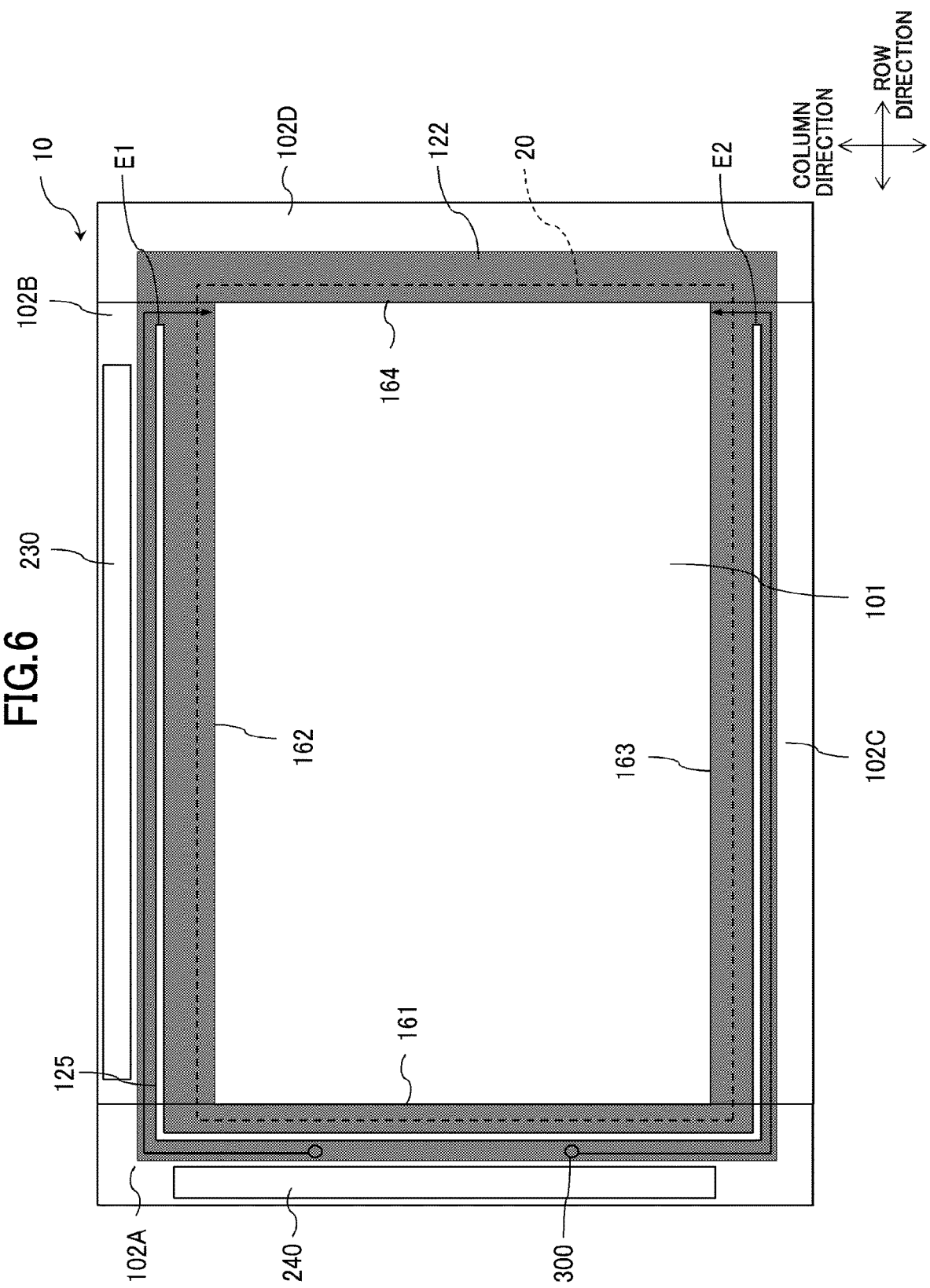
FIG. 6 is a view for illustrating a third example of the first slit formed in the non-light transmitting layer according to the first embodiment.

FIG. 6 is a view for illustrating a third example of the first slit 125 formed in the non-light transmitting layer 122 according to the first embodiment. FIG. 6 is a plan view of the display panel 10 as viewed from the CF substrate 12 side. The third example of the first slit 125 illustrated in FIG. 6 differs from the first example of the first slit 125 illustrated in FIG. 4 in the shape of the first slit 125, but other points are the same. Therefore, configurations similar to those in the first example of the first slit 126 illustrated in FIG. 4 are denoted by the same reference symbols, and redundant description thereof is omitted herein.

In the non-light transmitting layer 122 formed in the non-display region 102 illustrated in FIG. 6, the first slit 125 is formed, which extends through the first region 102A in which the gate driver 240 is arranged and the second region 102B, and further through the first region 102A in which the gate driver 240 is arranged and the third region 102C. The first slit 125 is formed so as to pass through the non-light transmitting layer 122. The first slit 125 illustrated in FIG. 6 is a single continuous slit, which seamlessly extends through the first region 102A, the second region 102b, and the third region 102C. In other words, one of the two end portions (first end portion E1) of the first slit 125 is included in the second region 102B, and the other thereof (second end portion E2) is included in the third region 102C. Further, the first slit 125 illustrated in FIG. 6 extends linearly along the first side 161 of the display region 101 in the first region 102A, extends linearly along the second side 162 of the display region 101 in the second region 102B, and extends linearly along the third side 163 of the display region 101 in the third region 102C. Therefore, the first slit 125 is formed so as to be bent substantially at a right angle at a corner portion of the non-display region 102 (corner portion at which the first region 102A and the second region 102B are in contact and corner portion at which the first region 102A and the third region 102C are in contact). Note that, the first slit 125 is not limited to an example of being formed so as to be bent substantially at a right angle at each corner portion. For example, the first slit 125 may be formed so as to be curved into an arc shape at each corner portion. Further, the first slit 125 may be formed into a shape extending along the outer shape of the display region 101.

The first slit 125 is formed so as to extend through the first region 102A in which the gate driver 240 is arranged, the second region 102B, and the third region 102C. Thus, the electric charges 300 generated by the wiring coupling of the gate line 14 move on the outer side of the first slit 125 to reach the first end portion E1 included in the second region 102B or the second end portion E2 included in the third region 102C, to thereby propagate to the display region 101. With this configuration, no matter which direction the electric charges 300 generated by the wiring coupling of the gate line 14 propagate between toward the first end portion E1 and toward the second end portion E2 of the first slit 125, a distance for the electric charges 300 to propagate to the display region 101 can be taken long. With this, the influence on the display image duo to the electric charges 300 generated by the wiring coupling of the gate line 14 is reduced.

Figure 7:
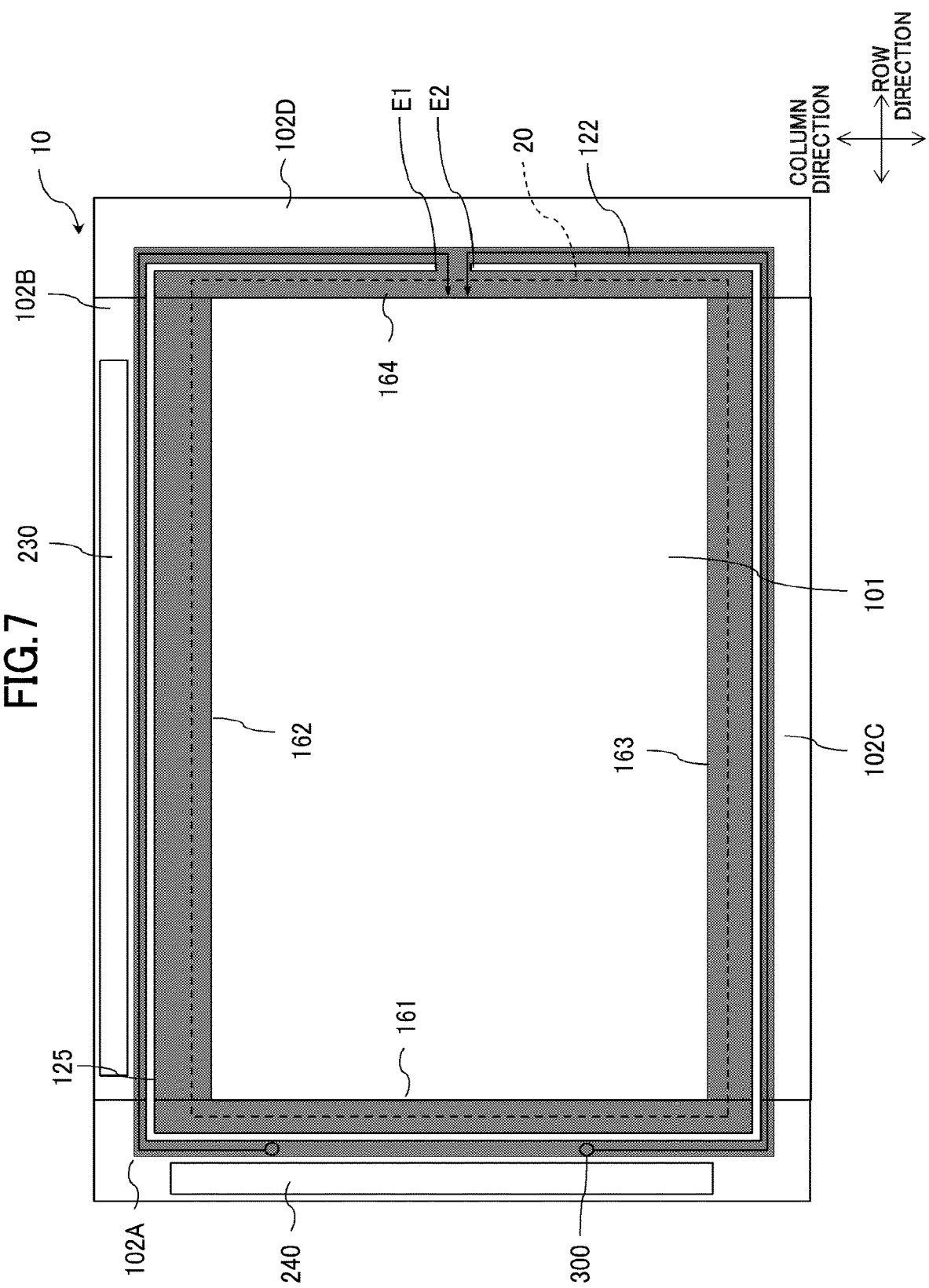
FIG. 7 is a view for illustrating a fourth example of the first slit formed in the non-light transmitting layer according to the first embodiment.

FIG. 7 is a view for illustrating a fourth example of the first slit 126 formed in the non-light transmitting layer 122 according to the first embodiment. FIG. 7 is a plan view of the display panel 10 as viewed from the CF substrate 12 side. The fourth example of the first slit 125 illustrated in FIG. 7 differs from the first example of the first slit 125 illustrated in FIG. 4 in the shape of the first slit 125, but other points are the same. Therefore, configurations similar to those in the first example of the first slit 125 illustrated in FIG. 4 are denoted by the same reference symbols, and redundant description thereof is omitted herein.

In the non-light transmitting layer 122 formed in the non-display region 102 illustrated in FIG. 7, the first slit 125 is formed, which extends through the first region 102A in which the gate driver 240 is arranged, the second region 102B, and the fourth region 102D, and further through the first region 102A, the third region 102C, and the fourth region 102D. The first slit 125 is formed so as to pass through the non-light transmitting layer 122. The first slit 125 illustrated in FIG. 7 is a single continuous slit, which seamlessly extends through the first region 102A, the second region 102B, the third region 102C, and the fourth region 102D. In other words, the two end portions (first end portion E1 and second end portion E2) of the first slit 125 are included in the fourth region 102D. In this case, the first end portion E1 and the second end portion E2 are formed for the purpose of releasing the static electricity generated in the display region 101 to the outside of the display region 101, and the first slit 125 does not surround the entire circumference of the display region 101 in the present invention. Further, the first slit 125 illustrated in FIG. 7 extends linearly along the first side 161 of the display region 101 in the first region 102A, extends linearly along the second side 162 of the display region 101 in the second region 102B, extends linearly along the third side 163 of the display region 101 in the third region 102C, and extends linearly along the fourth side 164 of the display region 101 in the fourth region 102D. Therefore, the first slit 125 is formed so as to be bent substantially at a right angle at a corner portion of the non-display region 102 (corner portion at which the first region 102A and the second region 102B are in contact, corner portion at which the first region 102A and the third region 102C are in contact, corner portion at which the second region 102B and the fourth region 102D are in contact, and corner portion at which the third region 102C and the fourth region 102D are in contact). Note that, the first slit 125 is not limited to an example of being formed so as to be bent substantially at a right angle at each corner portion. For example, the first slit 125 may be formed so as to be curved into an arc shape at each corner portion. Further, the first slit 125 may be formed into a shape extending along the outer shape of the display region 101.

The first slit 125 is formed so as to extend through the first region 102A in which the gate driver 240 is arranged, the second region 102B, the third region 102C, and the fourth region 102D. Thus, the electric charges 300 generated by the wiring coupling of the gate line 14 move on the outer side of the first slit 125 to reach the first end portion E1 or the second end portion E2 included in the fourth region 102D, to thereby propagate to the display region 101. With this configuration, no matter which direction the electric charges 300 generated by the wiring coupling of the gate line 14 propagate between toward the first end portion E1 and toward the second end portion E2 of the first slit 125, a distance for the electric charges 300 to propagate to the display region 101 can be taken long. With this, the influence on the display image due to the electric charges 300 generated by the wiring coupling of the gate line 14 is reduced.

Note that, in FIG. 7, the first slit 125 extends through four regions, specifically, the first region 102A, the second region 102B, the third region 102C, and the fourth region 102D, and the two end portions of the first slit 125 are arranged in the fourth region 102D. However, the first slit 125 is not limited to this example. For example, the two end portions of the first slit 125 may be arranged in the second region 102B, or may be arranged in the third region 102C.

Further, in the third example of the first slit 125 illustrated in FIG. 6 and the fourth example of the first slit 125 illustrated in FIG. 7, the first slit 125 may be arranged so as to be line symmetric with respect to the center line in the column direction of the display region 101. When the first slit 125 is arranged to be line symmetric with respect to the center line in the column direction of the display region 101, the distance that the electric charges 300 generated by the wiring coupling of the gate line 14 move can be equalized between the case where the electric charges 300 propagate to the display region 101 from the first end portion E1 and the case where the electric charges 300 propagate to the display region 101 from the second end portion E2.

In the examples of the first slit 12b according to the first embodiment described above, there is described an example in which the single first slit 125 is formed, but a plurality of first slits 125 may be formed.

Figure 8:
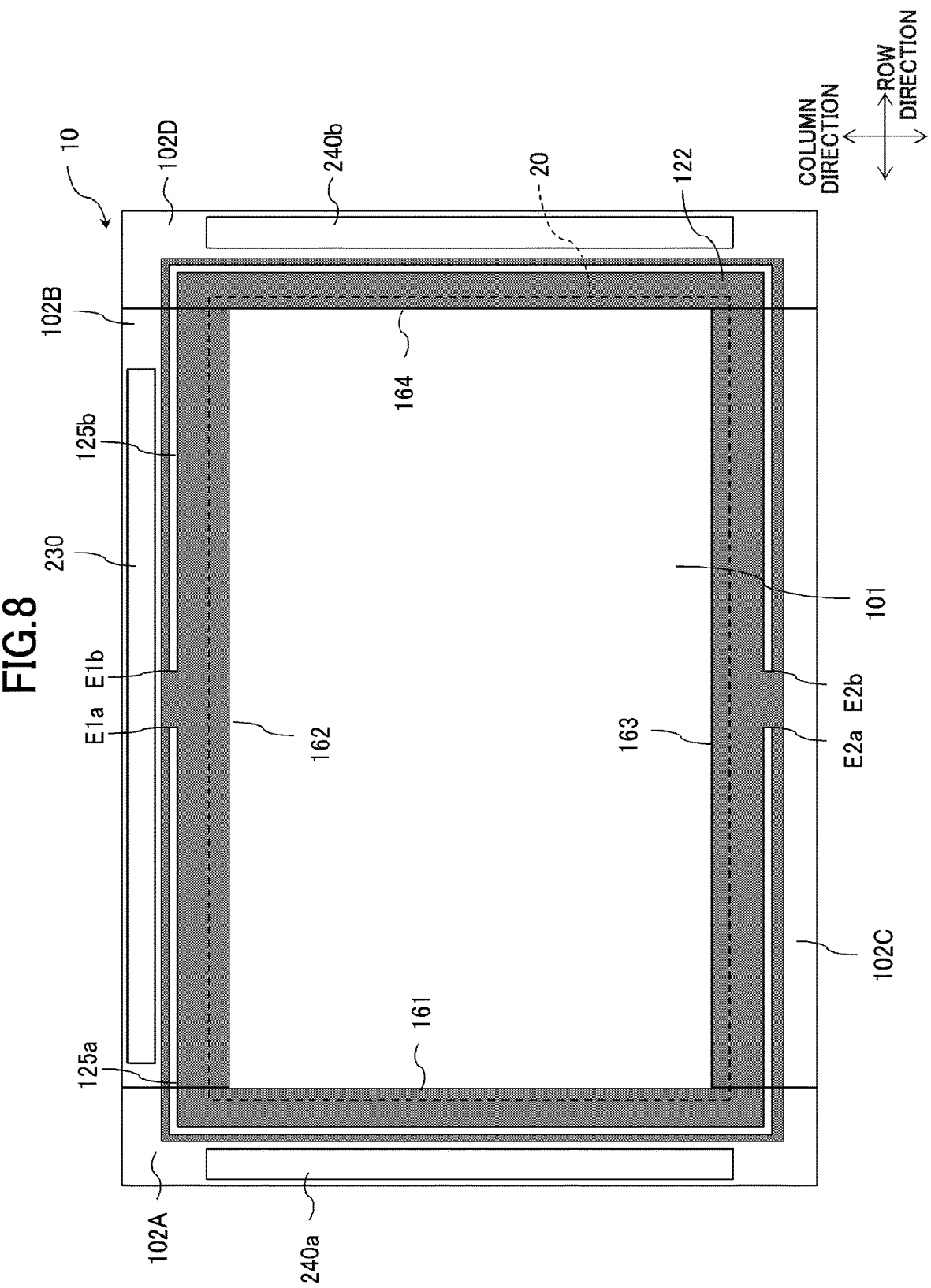
FIG. 8 is a view for illustrating a fifth example of the first slit formed in the non-light transmitting layer according to the first embodiment.

FIG. 8 is a view for illustrating a fifth example of the first slit 125 formed in the non-light transmitting layer 122 according to the first embodiment. In FIG. 8, the gate drivers 240 (gate driver 240a and gate driver 240b) are arranged in both of the first region 102A and the fourth region 102D. In this case, each of the two gate drivers 240 applies a pulsed gate signal to the gate line 14, and hence the electric charges 300 are generated by the wiring coupling of the gate line 14 in each of the first region 102A and the fourth region 102D. In view of this, as illustrated in FIG. 8, two first slits 125 (first slit 125a and first slit 125b) are formed so as to correspond to the regions (first region 102A and fourth region 102D) in which the two gate drivers 240 are arranged. For example, in the non-light transmitting layer 122 formed in the non-display region 102 illustrated in FIG. 8, the first slit 125a is formed, which extends through the first region 102A in which the gate driver 240a is arranged and the second region 102B, and further through the first region 102A and the third region 102C. The first silt 125a is a single continuous slit, which seamlessly extends through the first region 102A, the second region 102B, and the third region 102C. One of the two end portions (first end portion E1a) of the first slit 125a is included in the second region 102B, and the other thereof (second end portion E2a) is included in the third region 102C.

Further, in the non-light transmitting layer 122 formed in the non-display region 102, the first slit 125b is formed, which extends through the fourth region 102D in which the gate driver 240b is arranged and the second region 102B, and further through the fourth region 102D and the third region 102C. The first slit 125b is a single continuous slit, which seamlessly extends through the second region 102B, the third region 102C, and the fourth region 102D. One of the two end portions (first end portion E1b) of the first slit 125b is included in the second region 102B, and the other thereof (second end portion E2b) is included in the third region 102C.

Further, the length of the first slit 125a may be equal to the length of the first slit 125b. For example, as illustrated in FIG. 8, the first slit 125a and the first slit 125b may be arranged so as to be line symmetric with respect to the center line in the row direction of the display region 101. When the length of the first slit 125a is set equal to the length of the first slit 125b as described above, the distance for the electric charges 300 generated in the first region 102A to propagate to the display region 101 can be set equal to the distance for the electric charges 300 generated in the fourth region 102D to propagate to the display region 101.

Note that, the first slit 125a may be formed so as to extend through the first region 102A and the second region 102B, and the first slit 125b may be formed so as to extend through the third region 102C and the fourth region 102D. Further, the first slit 125a may be formed so as to extend through the first region 102A and the third region 102C, and the first slit 125b may be formed so as to extend through the second region 102B and the fourth region 102D.

Further, the first slit 125 may be formed so as to extend through the region in which the gate driver 240 is arranged and the region in which the source driver 230 is arranged. Specifically, for example, when the gate driver 240 is arranged in the first region 102A and the source driver 230 is arranged in the third region 102C, the first slit 125 may be formed so as to extend through the first region 102A and the third region 102C. Further, when the gate driver 240 is arranged in each of the first region 102A and the fourth region 102D and the source driver 230 is arranged in the second region 102B, as illustrated in FIG. 5, the first slit 125 may be formed so as to extend through the first region 102A, the second region 102B, and the fourth region 102D. In the liquid crystal display device 1, there is a case where the source driver 230 supplies a control signal to the gate driver 240. In this case, a control signal line configured to supply a control signal from the source driver 230 to the gate driver 240 is arranged at the corner portion of the non-display region 102, and hence there is a fear in that the electric charges 300 generated by the wiring coupling of the control signal line arranged at the corner portion may propagate to the display region 101. In such a case, when the first slit 125 is formed so as to extend through the region in which the gate driver 240 is arranged and the region in which the source driver 230 is arranged, the influence on the display image due to the electric charges 300 generated by the wiring coupling of the control signal line arranged at the corner portion of the non-display region 102 can be reduced.

Second Embodiment

Figure 9:
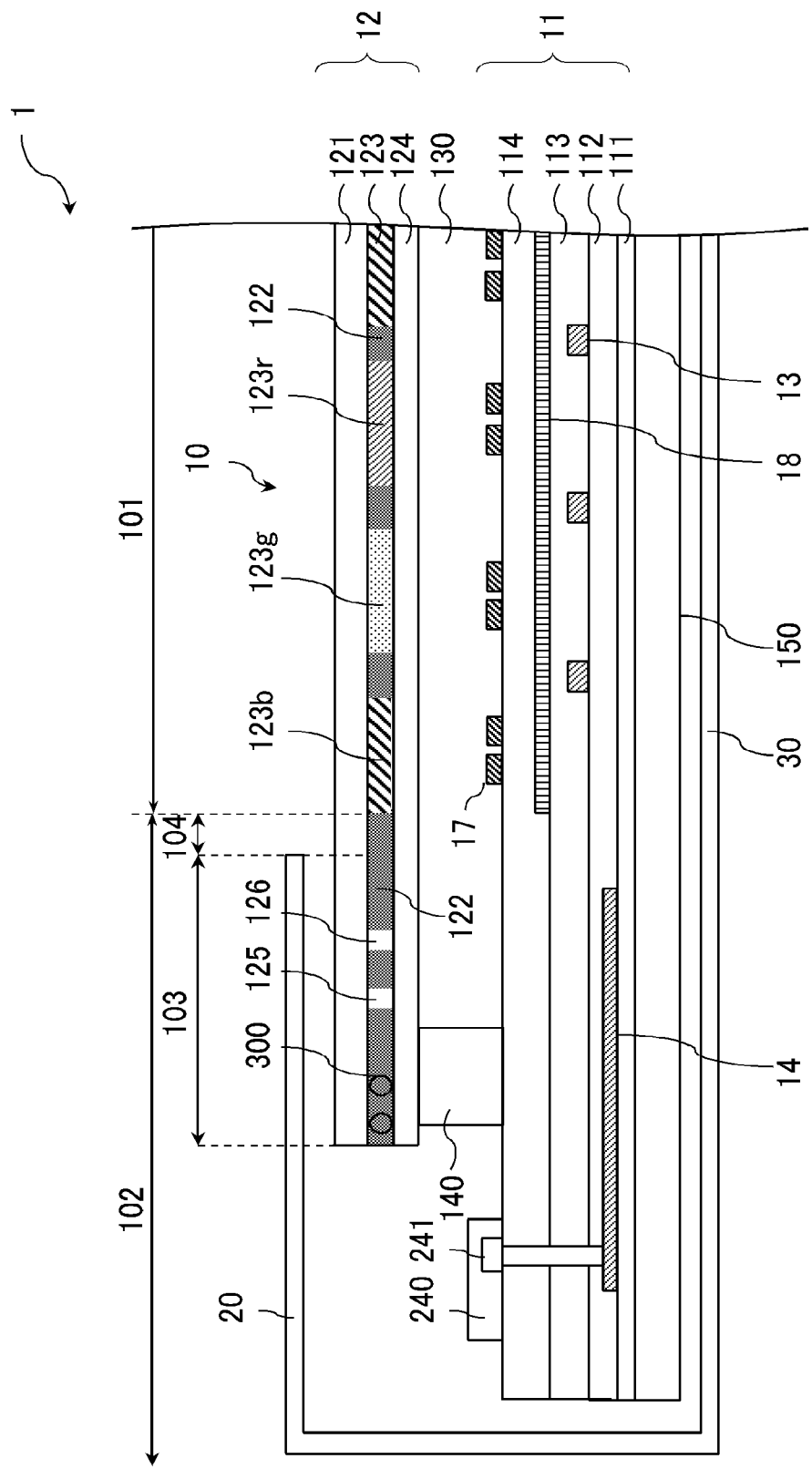
FIG. 9 is a sectional view for illustrating an example of a configuration of a liquid crystal display device according to a second embodiment of the present invention.
Figure 10:
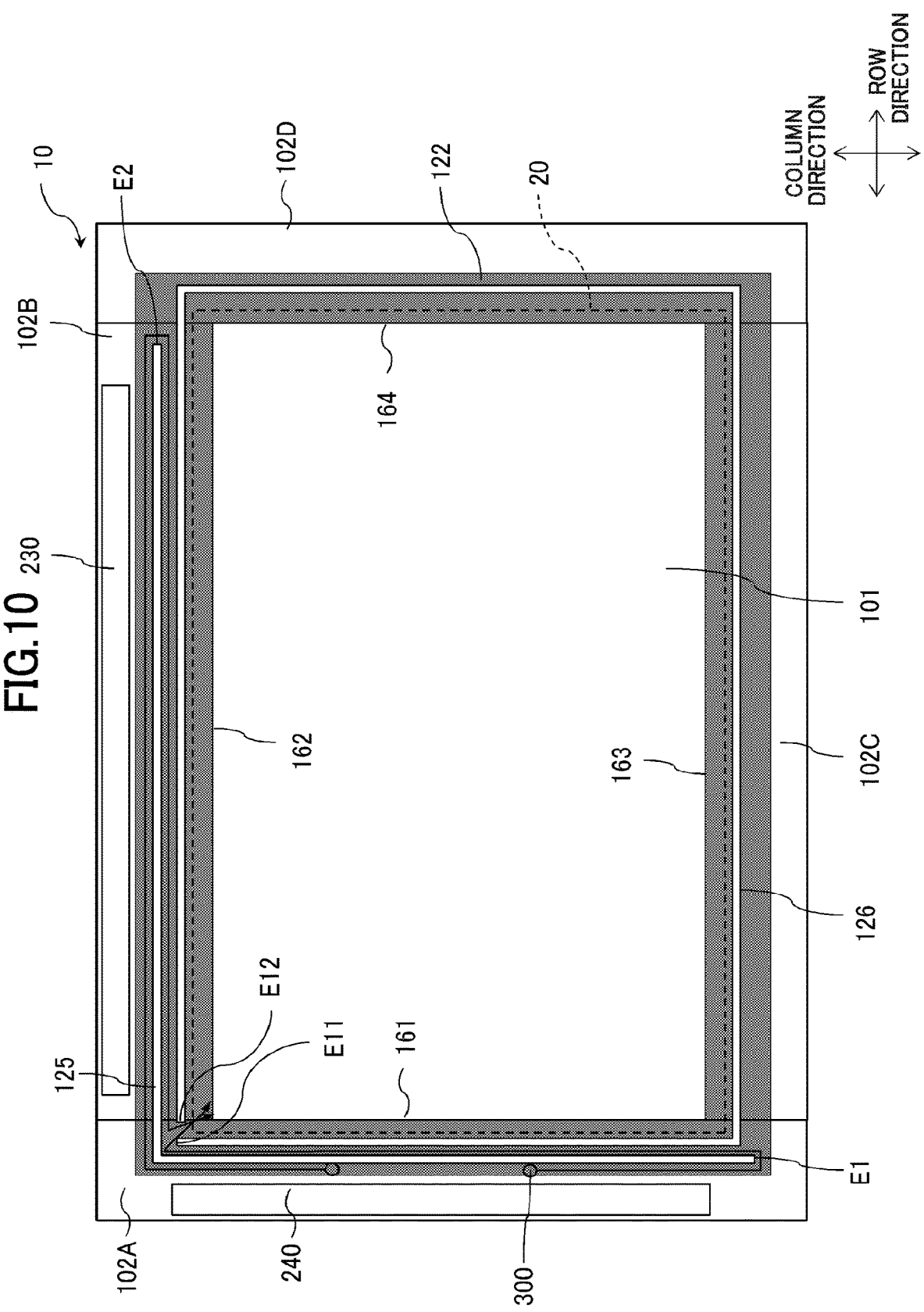
FIG. 10 is a view for illustrating a first example of a second slit formed in a non-light transmitting layer according to the second embodiment.

In a second embodiment of the present invention, in addition to the first slit 125 described in the first embodiment, a second slit 126 different from the first slit 125 is formed. FIG. 9 is a sectional view for illustrating an example of the configuration of the liquid crystal display device 1 according to the second embodiment. The sectional structure of the liquid crystal display device 1 according to the second embodiment illustrated in FIG. 9 differs from the sectional structure of the liquid crystal display device 1 according to the first embodiment illustrated in FIG. 3 in the point that the second slit 126 is included, but other points are the same. FIG. 10 is a view for illustrating a first example of the second slit 126 formed in the non-light transmitting layer 122 according to the second embodiment. FIG. 10 is a plan view of the display panel 10 as viewed from the CF substrate 12 side. The second embodiment illustrated in FIG. 10 differs from the first embodiment illustrated in FIG. 4 in the point that the second slit 126 is included, but other points are the same. Therefore, in FIG. 9 and FIG. 10, configurations similar to those in the first embodiment are denoted by the same reference symbols, and redundant description thereof is emitted herein.

In the non-light transmitting layer 122 formed in the non-display region 102 illustrated in FIG. 10, first, the first slit 125 is formed. For example, as illustrated in FIG. 10, the first slit 125 is formed so as to extend through the first region 102A in which the gate driver 240 is arranged and the second region 102B. Note that, the first slit 125 may be formed into the shape illustrated in FIG. 5 to FIG. 8. Then, in the non-light transmitting layer 122 formed in the non-display region 102, the second slit 126 different from the first slit 125 is formed in addition to tire first slit 125. The second slit 126 illustrated in FIG. 10 is a single continuous slit, which is formed through the first region 102A, the second region 102B, the third region 102C, and the fourth region 102D.

The second slit 126 is formed so as to extend on the inner side (display region 101 side) of each of the two end portions of the first slit 125. When the second slit 126 is not formed, the electric charges 300 generated by the wiring coupling of the gate line 34 move to the display region 101 from the first end portion E1, for example. In order to avoid such movement of the electric charges 300 to the display region 101 from the end portion of the first slit 125, the second slit 126 may be formed so as to extend at least on the inner side (display region 101 side) of each of the two end portions of the first slit 125. In other words, in a direction in which the end portion of the first slit 125 reaches the display region 101 at a shortest distance (in this case, the column direction), the end portion of the first slit 125 is prevented from overlapping with the end portion of the second slit 126. In other words, the second slit 126 is formed so that, when the non-display region 102 is viewed from the display region 101, the second slit 126 covers the end port ion of the first slit 125. Further, a part of the second silt 326 is formed along the first slit 125 and between the first slit 125 and the display region 101. With this, the path for the electric charges 300 generated by the wiring coupling of the gate line 14 to propagate to the display region 103 can be taken long.

Further, it is preferred that a part of the second slit 126 be formed in a region in which the first slit 125 is not formed in the non-display region 102. With this, in the non-display region 102, the first slit 125 and the second slit 126 are formed so that at least one of the first slit 125 or the second slit 126 surrounds the display region 101. Therefore, the path for the electric charges 300 generated by the wiring coupling of the gate line 14 to propagate to the display region 101 can be taken long. Further, in the non-display region 102, the first slit 125 and the second slit 126 are formed so that at least one of the first slit 125 or the second slit 126 surrounds the display region 101, and hence propagation to the display region 101 of the electric charges generated by the wiring coupling of various wirings other than the gate line 14 can be reduced. Note that, the second slit 126 may be formed in a region in which wiring other than the gate line 14 (for example, testing wiring) is arranged, in which the electric charges are generated by the wiring coupling.

Further, it is preferred that each of the two end portions of the second slit 126 be arranged in a region in which the first slit 125 is formed, and each of the two end portions of the second slit 126 overlap with the first slit 125 in a direction opposite to the direction in which the end portion of the second slit 126 reaches the display region 101 at the shortest distance. With this, the path for the electric charges 300 generated by the wiring coupling of the gate line 14 to propagate to the display region 101 can be taken long. Further, the end portion of the first slit 125 and the end portion of the second slit 126 may be arranged so that the distance therebetween is long. For example, each of the two end portions of the second slit 126 may be arranged in a region in which the first slit 125 is formed, and each of the two end portions of the second slit 126 may overlap with the center portion of the first slit 125 in the direction opposite to the direction in which the end portion of the second slit 126 reaches the display region 101 at the shortest distance. With this, the movement distance of the electric charges 300 moving from the first end portion E1 of the first slit 125 to a first end portion E11 of the second slit 126 and the movement distance of the electric charges 300 moving from the second end portion E2 of the first slit 125 to a second end portion E12 of the second slit 126 can be set equal to each other.

Specifically, as illustrated in FIG. 10, the second slit 126 is formed so as to cover the end portion of the first slit 125 when the non-display region 102 is viewed from the display region 101. Further, a part of the second slit 126 extends along the first slit 125 and between the first slit 125 and the display region 101. Further, a part of the second slit 126 is formed through the third region 102C and the fourth region 1025 in which the first slit 125 is not formed. Further, each of the first end portion E11 and the second end portion E12 of the second slit 126 is included in the first region 102A. Further, the first end portion E11 is arranged so as to overlap with the first slit 125 in the direction opposite to the direction in which the first end portion E11 reaches the display region 101 at the shortest distance. Further, the second end portion E12 is arranged so as to overlap with the first slit in the direction opposite to the direction in which the second end portion E12 reaches the display region 101 at the shortest distance. In this case, the first end portion E11 and the second end portion E12 are formed so at to release the static electricity generated in the display region 101 to the outside of the display region 101, and the second slit 126 does not surround the entire circumference of the display region 101 in the present invention.

As described above, the shape and the arrangement position of the second slit 126 are determined based on the shape and the arrangement position of the first slit 125 (in particular, the position of the end portion of the first slit 125). When the second slit 126 is formed as described above, the electric charges moving on the outer side of the first slit 125 can be prevented from moving toward the display region 101 at the first end portion E1 or the second end portion E2. Then, the electric charges reaching first end portion E1 or the second end portion E2 move between the first slit 125 and the second slit 126, and then move toward the display region 101 from the and portion of the second slit 126. As described above, the path for the electric charges 300 generated by the wiring coupling of the gate line 14 to propagate to the display region 101 can be taken long, and hence the influence on the display image due to the electric charges generated by the wiring coupling of the gate line 14 further reduced.

Figure 11:
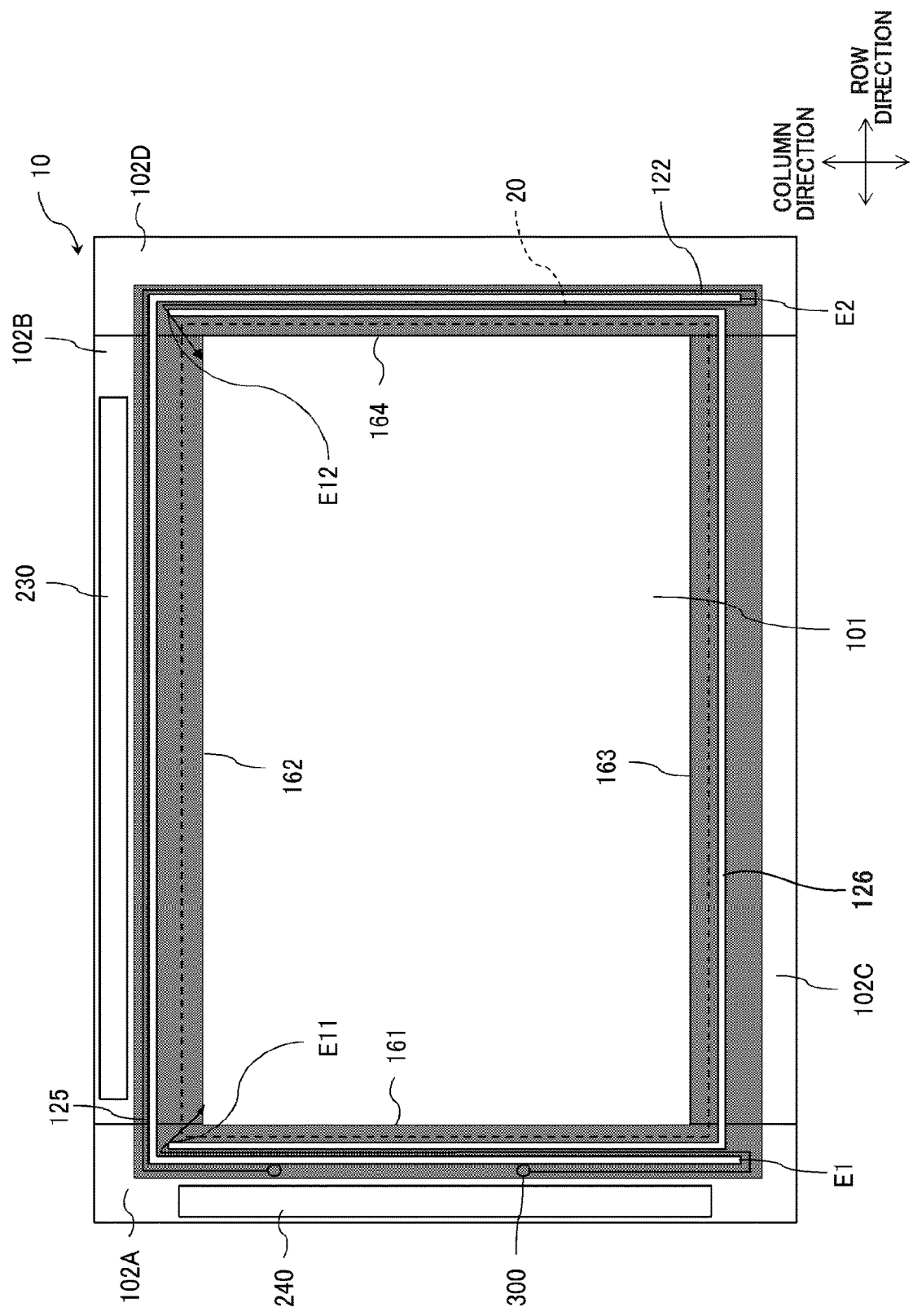
FIG. 11 is a view for illustrating a second example of the second slit formed in the non-light transmitting layer according to the second embodiment.

Note that, the second slit 126 is not limited to the shape illustrated in FIG. 10. The shape of the second slit 126 can be changed as appropriate as long as the path for the electric charges 300 generated by the wiring coupling of the gate line 14 to propagate to the display region 101 can be taken long. For example, when the second slit 126 is further formed in addition to the first slit 125 illustrated in FIG. 5, the second slit 126 as illustrated in FIG. 11 may be formed. FIG. 11 is a view for illustrating a second example of the second slit 126 formed in the non-light transmitting layer 122 according to the second embodiment. As illustrated in FIG. 11, the second slit 126 is formed based on the shave and the arrangement position of the first slit 125. Specifically, the second slit 126 is formed so as to cover the end portions (first end portion E1 and second end portion E2) of the first slit 125 when the non-display region 102 is viewed from the display region 101. Farther, a part of the second slit 126 is formed along the first slit 125 and between the first slit 125 and the display region 101. Further, a part of the second slit 126 is formed through the third region 102C in which the first 125 is not formed. Further, the first end portion E11 of the second slit 126 is included in the first region 102A. Further, the second end portion E12 of the second slit 126 is included in the fourth region 102D. Further, the first end portion E11 is arranged so as to overlap with the first slit 125 in the direction opposite to the direction in which the first end portion E11 reaches the display region 101 at the shortest distance. Further, the second end portion E12 is arranged so as to overlap with the first slit 125 in the direction opposite to the direction in which the second end portion E12 reaches the display region 101 at the shortest distance. Note that, in FIG. 11, the first end portion E11 and the second end portion E12 of the second slit 126 may be included in the second region 102B.

Figure 12:
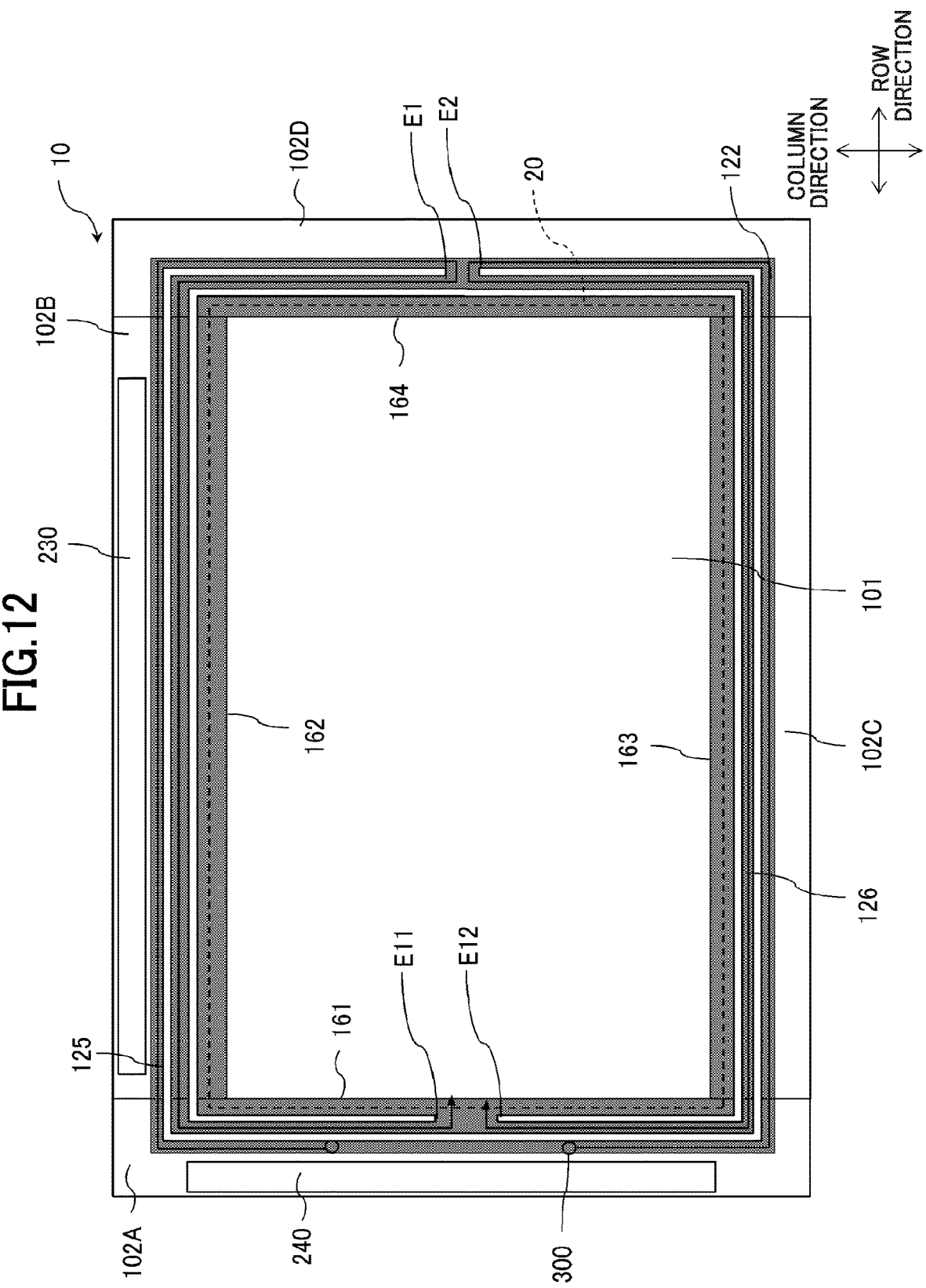
FIG. 12 is a view for illustrating a third example of the second slit formed in the non-light transmitting layer according to the second embodiment.

When the second slit 126 is further formed in addition to the first slit 125 illustrated in FIG. 7, the second slit 126 as illustrated in FIG. 12 may be formed. FIG. 12 is a view for illustrating a third example of the second slit 126 formed in the non-light transmitting layer 122 according to the second embodiment. As illustrated in FIG. 12, the second slit 126 is formed based on the shape and the arrangement position of the first slit 125. Specifically, the second slit 126 is formed so as to cover the end portions (first end portion E1 and second end portion E2) of the first slit 125 when the non-display region 102 viewed from the display region 101. Further, a part of the second slit 126 is formed along the first slit 125 and between the first slit 125 and the display region 101. Further, each of the first end portion E11 and the second end portion E12 of the second slit 126 is included in the first region 102A. Further, the first end portion E11 is arranged so as to overlap with the center portion of the first slit 125 in the direction opposite to the direction in which the first end portion E11 reaches the display region 101 at the shortest distance. Further, the second end portion 112 is arranged so as to overlap with the center portion of first slit 125 in the direction opposite to the direction in which the second end portion 112 reaches the display region 101 at the shortest distance. Note that, in FIG. 12, the first end portion E11 of the second slit 126 man be formed in the second region 102B, and the second end portion E12 of the second slit 126 may be formed in the third region 102C. Further, the first end portion E11 of the second slit 126 may be formed in the fourth region 102D, and the second end portion E12 of the second slit 126 may be formed in the third region 102C. Further, first end portion E11 of the second slit 125 may be formed in the fourth region 102D, and the second end portion 112 of the second slit 126 may be formed in the first region 102A.

Figure 13:
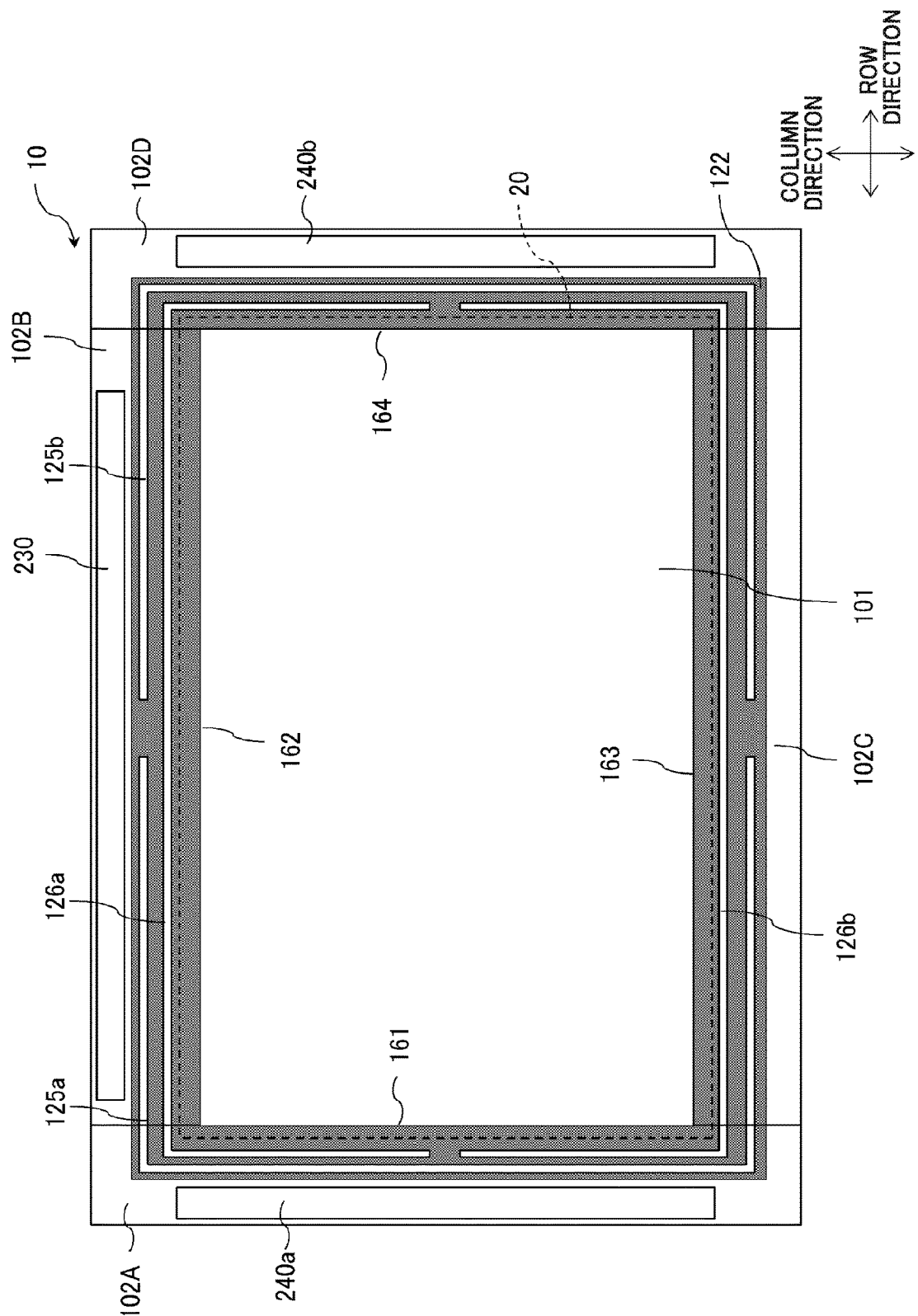
FIG. 13 is a view for illustrating a fourth example of the second slit formed in the non-light transmitting layer according to the second embodiment.

Further, the second slit 126 may include a plurality of slits. For example, in FIG. 10 and FIG. 11, the second slit 125 may include two slits, specifically, a slit formed so as to cover the first end portion E1 of the first slit 125 when the non-display region 102 is viewed from the display region 101, and a slit formed so as to cover the second end portion E2 of the first slit 125 when the non-display region 102 is viewed from the display region 101. Further, FIG. 13 is a view for illustrating a fourth example of the second slit 126 formed in the non-light transmitting layer 122 according to the second embodiment. As illustrated in FIG. 13, for example, when the second slit 126 is further formed in addition to the plurality of first slits 125 illustrated in FIG. 8, the second slit 126 may include two second slits 126 (second slit 126a and second slit 126b). The two second slits 126 may be formed based on the shapes and the arrangement positions of the respective two first slit 125 (first slit 125a and first slit 125b). Specifically, when the non-display region 102 is viewed from the display region 101, the second slit 126 (second slit 126a and second slit 126b) is formed so as to cover end portion of the first slit 125 (first slit 125a and first slit 125b). In FIG. 13, the second slit 126a is formed so as to extend through the first region 102A, the second region 102B, and the fourth region 102D, and the second slit 126b is formed so as to extend through the first region 102A, the third region 102C, and the fourth region 102D. Note that, in FIG. 13, the second slit 125a may be formed in the second region 102B, and the second slit 126b may be formed in the third region 102C.

Based on the example of the second slit 126 formed in the non-light transmitting layer 122 according to the second embodiment described above, it can be said that at least one side of the non-display region 102 (in other words, any one of the first region 102A to the fourth region 102D) includes a region in which the first slit 125 and the second slit 126 extend in parallel with each other, and a region in which only the first slit 125 extends.

Further, as illustrated in FIG. 3 and FIG. 9, the non-light transmitting layer 122 includes an overlapping region 103 overlapping with the upper frame 201 in plan view, and a non-overlapping region 104 free from overlapping with the upper frame 20 in plan view. The non-overlapping region 104 can be easily viewed by a viewer, and hence it is preferred that the first slit 125 and the second slit 126 described above be formed in the overlapping region 103.

However, when there is no room for forming a slit in the overlapping region 103, the first slit 125 and the second slit 126 are formed in the non-overlapping region 104. Further, a part of the first slit 125 may be formed in the non-overlapping region 104. When a part of the first slit 125 is formed in the non-overlapping region 104, the end portion of the first slit 125 may be prevented from being arranged in the non-overlapping region 104.

Figure 14:
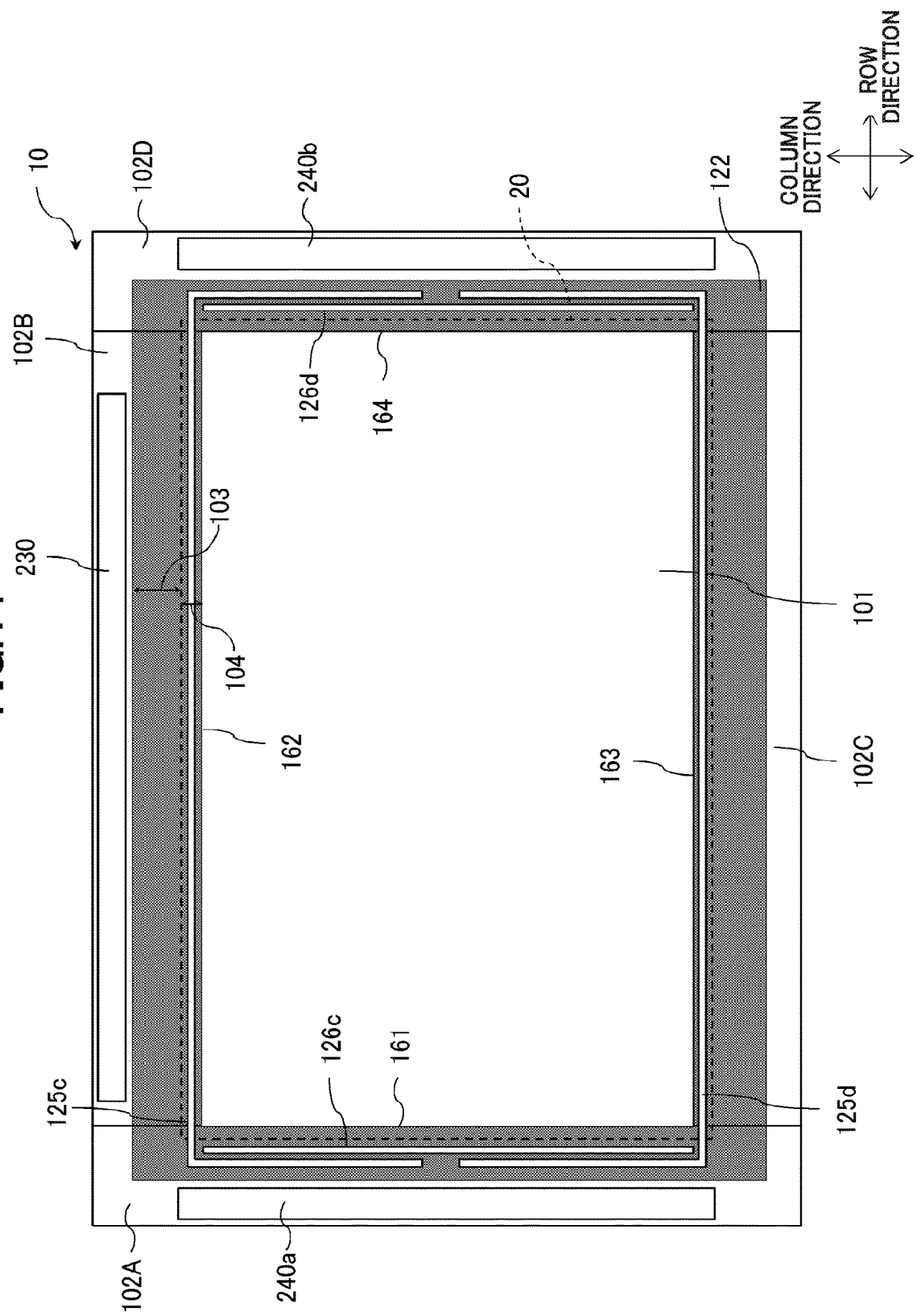
FIG. 14 is a view for illustrating an example of the first slit formed in a non-overlapping region.

FIG. 14 is a view for illustrating an example of the first slit 125 formed in the non-overlapping region 104. In FIG. 14, the gate driver 210 (gate driver 240a or gate driver 240b) is arranged in each of the first region 102A and the fourth region 102D. Further, the first slit 125 includes two first slits 125 (first slit 125c and first slit 125d). Further, the second slit 126 includes two second slits 126 (second slit 126c and second slit 126d). The first slit 125c is formed so as to extend through the first region 102A, the second region 102B, and the fourth region 102D. The first slit 125d is formed so as to extend through the first region 102A, the third region 102C, and the fourth region 102D. Further, a part of the first slit 125c (part included in the second region 102B) is formed in the non-overlapping region 104. Further, a part of the first slit 125d (part included in the third region 102C) is formed in the non-overlapping region 104. In this case, the two end portions of the first slit 125c are respectively arranged in the first region 102A and the fourth region 102D so as not to be arranged in the non-overlapping region 104. Further, the two end portioned of the first slit 125d are respectively arranged in the first region 102A and the fourth region 102D so as not to be arranged in the non-overlapping region 104. Further, the second slit 126c is formed so that, in the first region 102A, the second slit 126c covers the end portion of the first slit 125c and the end portion of the first slit 125d when the non-display region 102 is viewed from the display region 101. Further, the second slit 126d is formed so that, in the fourth region 102D, the second slit 120d covers the end portion of the first slit 125c and the end portion of the first slit 125d when the non-display region 102 is viewed from the display region 101. As described above, the end portion of the first slit 125 is prevented from being arranged in the non-overlapping region 104, and thus the end portion of the first slit 125 is hardly viewed by the viewer. Further, even when the end portion of the first slit 125 is arranged in the region in which the gate driver 240 is arranged, the second slit 126 is formed so as to cover the end portion of the first slit 125 when the non-display region 102 is viewed from the display region 101. Therefore, the path for the electric charges 300 generated by the wiring coupling of the gate line 14 to propagate to the display region 101 can be taken long. Further, similarly, a part of the second slit 126 may be formed in the non-overlapping region 104. When a part of the second slit 126 is formed in the non-overlapping region 104, the end portion of the second slit 126 may be prevented from hexing formed in the non-overlapping region 104.

Further, the width of the slit formed in the overlapping region 103 may be larger than the width of the slit formed in the non-overlapping region 104. With this, the passing through the slit formed in the non-overlapping region 104 is hardly viewed by the viewer.

Further, the second slit 126 may be formed on the outer side with respect to the first slit 125. FIG. 15 is a view for illustrating an example of the second slit 125 formed on the outer side with respect to the first slit 125. In FIG. 15, the gate driver 240 gate driver 240 gate driver 240b) is arranged in of the first region 102A and the fourth region 102D. Further, the first slit 125 is formed so as to extend through the first region 102A, the second region 102B, the third region 102C, and the fourth region 102D. Each of the two end portions of the first slit 125 is arranged in the third region 102C. A part of the first slit 125 (part included in the first region 102A, the third region 103C, and the fourth region 104D) is formed in the non-overlapping region 104. In this case, when wiring such as the testing wiring, in which the electric charges are generated by the wiring coupling, is arranged in the third region 102D, the second slit 126 is formed on the outer side with respect to the first slit 125 in the third region 102C. With this, the path for the electric charges generated by the wiring coupling of the testing wiring or the like to propagate to the display region 101 can be taken long, and hence the influence display image due to the electric charges can be reduced.

Further, each of the first slit 125 and the second slit 126 may be filled with a color resist of blue, red, green, or the like. For example, when each of the first slit 125 and the second slit 126 is filled with the blue resist, the color of the light passing through each of the first slit 125 and the second slit 126 is blue. Thus, when the viewer close to the display surface views the non-display region, the light passing through each of the first slit 125 and the second slit 126 is obscure.

Further, in the above mentioned embodiment, there is described an example in which the first slit 125 and the second slit 126 are formed the non-light transmitting layer 122, but three or more slits may be formed in the non-light transmitting layer 122.

While there have been described what are at present considered to be certain embodiments of the invention, it will be understood that various modifications may be made thereto, and it is intended that the appended claims cover all such modifications as fall within the true spirit and scope of the invention.

The invention claimed is:

1. A liquid crystal display device, comprising:
    a first substrate having a plurality of gate lines extending in a row direction and a plurality of data lines extending in a column direction;
    a second substrate disposed opposite to the first substrate;
    a liquid crystal layer disposed between the first substrate and the second substrate; and
    a sealing member surrounding the liquid crystal layer, wherein
    the liquid crystal display device comprises a display region in which an image is to be displayed, and a non-display region formed into a frame shape surrounding the display region,
    the second substrate has a non-light transmitting layer,
    the non-light transmitting layer has a first slit and a second slit in the non-display region,
    the first slit and the second slit are parallel to each other,
    the first slit and the second slit are disposed between the sealing member and the display region in planar view,
    the second slit has a first end portion and a second end portion, and
    a center portion of the first slit covers the first end portion of the second slit in the direction in which the display region reaches the first end portion at the shortest distance in one side of the second substrate.

2. The liquid crystal display device according to claim 1, wherein
    the first slit is disposed along an outer line of the second substrate.

3. The liquid crystal display device according to claim 2, further comprising:
    a gate driver disposed in the non-display region, wherein the first slit and the second slit is disposed between the gate driver and the display region.

4. The liquid crystal display device according to claim 3, further comprising:
    an upper frame arranged on a front surface side of the display panel, wherein
    the first slit overlaps with the upper frame in planer view.

5. The liquid crystal display device according to claim 4, wherein
    the second slit overlaps with the upper frame in planer view.

6. The liquid crystal display device according to claim 5, wherein
    the first slit overlaps with one of the plurality of gate lines in planer view.

7. The liquid crystal display device according to claim 6, wherein
    the second slit overlaps with the one of the plurality of gate lines in planer view.

8. The liquid crystal display device according to claim 1, wherein the center portion of the first slit covers the second end portion of the second slit in the direction in which the display region reaches the first end portion at the shortest distance in the one side of the second substrate.

9. The liquid crystal display device according to claim 8, wherein the second slit is disposed between the first slit and the display region.

10. The liquid crystal display device according to claim 9, further comprising:
    a gate driver disposed in the non-display region, wherein the first slit and the second slit is disposed between the gate driver and the display region.

11. The liquid crystal display device according to claim 9, wherein
    the non-light transmitting layer is arranged on a straight line connecting the first end portion and the second end portion, and
    the first slit covers the non-light transmitting layer arranged on the straight line connecting the first end portion and the second end portion in the direction in which the display region reaches the first end portion at the shortest distance in the one side of the second substrate.

12. A liquid crystal display device, comprising:
    a first substrate having a plurality of gate lines extending in a row direction and a plurality of data lines extending in a column direction;
    a second substrate disposed opposite to the first substrate;
    a liquid crystal layer disposed between the first substrate and the second substrate; and
    a sealing member surrounding the liquid crystal layer, wherein
    the liquid crystal display device comprises a display region in which an image is to be displayed, and a non-display region formed into a frame shape surrounding the display region,
    the second substrate has a non-light transmitting layer,
    the non-light transmitting layer has a first slit and a second slit in the non-display region,
    the first slit and the second slit are parallel to each other,
    the first slit and the second slit are disposed between the sealing member and the display region in planar view,
    the second slit has a first end portion and a second end portion,
    the non-light transmitting layer is arranged on a straight line connecting the first end portion and the second end portion, and the first slit covers the non-light transmitting layer arranged on a straight line connecting the first end portion and the second end portion in a direction which the display region reaches the first end portion at the shortest distance in one side of the second substrate.

13. The liquid crystal display device according to claim 12, wherein
the non-light transmitting layer arranged on the straight line is arranged so as to overlap with the center portion of the first slit in the direction in which the display region reaches the first end portion at the shortest distance in the one side of the second substrate.

14. The liquid crystal display device according to claim 12, wherein
the non-light transmitting layer is fully arranged on a straight line connecting the first end portion and the second end portion.

* * * * *